US012515372B2

(12) United States Patent
Walker et al.

(10) Patent No.: US 12,515,372 B2
(45) Date of Patent: Jan. 6, 2026

(54) APPARATUS FOR PREPARATION OF SINTERED CERAMIC BODY OF LARGE DIMENSION

(71) Applicant: Heraeus Covantics North America LLC, Chandler, AZ (US)

(72) Inventors: Luke Walker, Chandler, AZ (US); Matthew Joseph Donelon, Chandler, AZ (US); Lillian Thompson, Chandler, AZ (US)

(73) Assignee: Heraeus Covantics North America LLC, Chandler, AZ (US)

( * ) Notice: Subject to any disclaimer, the term of this patent is extended or adjusted under 35 U.S.C. 154(b) by 120 days.

(21) Appl. No.: 18/247,372

(22) PCT Filed: Sep. 30, 2021

(86) PCT No.: PCT/US2021/052978
§ 371 (c)(1),
(2) Date: Mar. 30, 2023

(87) PCT Pub. No.: WO2022/072703
PCT Pub. Date: Apr. 7, 2022

(65) Prior Publication Data
US 2023/0415377 A1  Dec. 28, 2023

Related U.S. Application Data

(60) Provisional application No. 63/124,547, filed on Dec. 11, 2020, provisional application No. 63/087,204, filed on Oct. 3, 2020.

(51) Int. Cl.
*B28B 11/24* (2006.01)
*B28B 3/02* (2006.01)
*B28B 3/08* (2006.01)

(52) U.S. Cl.
CPC .................. *B28B 11/243* (2013.01)

(58) Field of Classification Search
CPC ....... B28B 11/04; B28B 11/243; B28B 3/025; B28B 3/086; B30B 11/04; B30B 15/34;
(Continued)

(56) References Cited

U.S. PATENT DOCUMENTS 5,798,016 A  8/1998 Oehrlein et al.
5,911,852 A  6/1999 Katayama et al.
(Continued)

FOREIGN PATENT DOCUMENTS

CN  106116581 A  11/2016
CN  108165859 A  6/2018
(Continued)

OTHER PUBLICATIONS

English translation of JP2013115156A (Year: 2013).*
(Continued)

*Primary Examiner* — Galen H Hauth
*Assistant Examiner* — Baileigh Kate Darnell
(74) *Attorney, Agent, or Firm* — Dicke, Billig & Czaja, PLLC

(57) ABSTRACT

A spark plasma sintering tool. The tool comprises a die including an inner wall having a diameter that defines an inner volume configured to receive a ceramic powder, and an upper punch and a lower punch operably coupled with the die, wherein each of the upper and lower punches have an outer wall defining a diameter that is less than the diameter of the inner wall of the die thereby creating a gap from 10 μm to 100 μm wide between each of the punches and the inner wall of the die when at least one of the punches moves within the inner volume of the die. Also disclosed is a method of using the tool to create a large sintered ceramic body and a computer readable medium storing processor-
(Continued)

executable instructions adapted to cause one or more computing devices to operate the tool.

15 Claims, 12 Drawing Sheets

(58) Field of Classification Search
CPC ..... C04B 35/44; C04B 35/505; C04B 35/645; C04B 2235/3225; C04B 2235/3227; C04B 2235/5418; C04B 2235/5427; C04B 2235/5436; C04B 2235/5463; C04B 2235/5481
See application file for complete search history.

(56) References Cited

U.S. PATENT DOCUMENTS

| | | | |
|---|---|---|---|
| 6,123,791 A | 9/2000 | Han et al. | |
| 6,352,611 B1 | 3/2002 | Han et al. | |
| 8,772,190 B2 | 7/2014 | Shen et al. | |
| 2006/0172073 A1* | 8/2006 | Groza | C04B 35/64 427/372.2 |
| 2013/0280520 A1 | 10/2013 | Pan et al. | |
| 2015/0132585 A1* | 5/2015 | Pan | C09K 11/617 252/301.4 F |
| 2015/0221398 A1 | 8/2015 | Subhash et al. | |
| 2018/0281063 A1* | 10/2018 | Schmitt | B30B 15/026 |

FOREIGN PATENT DOCUMENTS

| | | |
|---|---|---|
| CN | 110157947 A | 8/2019 |
| JP | H10251068 A | 9/1998 |
| JP | 2 983268 B2 | 11/1999 |
| JP | 2002299702 A | 10/2002 |
| JP | 2004/068089 A | 3/2004 |
| JP | 2012 106929 A | 6/2012 |
| JP | 2013 115156 A | 6/2013 |
| WO | 2013/158929 A1 | 10/2013 |

OTHER PUBLICATIONS

Grasso et al. ("Effects of Initial Punch-Die Clearance in Spark Plasma Sintering Process", Materials Transactions, vol. 49, No. 12 (2008) pp. 2899 to 2906) (Year: 2008).*
"High-Density Products (Isostatic Graphite/Molded Products) Characteristics Table" (Nippon Techno-Carbon Co. Ltd., n.d. www.technocarbon.co.jp/pdf/characteristic_table1_en.pdf. Mar. 11, 2025).*
"Graphite Machined Components" (Premium Graphite Pvt. Ltd., 2018. www.premiumgraphite.com/services/graphite-machined-components/. Mar. 11, 2025) (Year: 2019).*
Gorynski C., et al., "Controlling current flow in sintering: A facile method coupling flash with spark plasma sintering", Review of Scientific Instruments, American Institute of Physics, 2 Huntington Quadrangle, Melville, NY 11747, vol. 91, No. 1, Jan. 16, 2020 (Jan. 16, 2020), XP012243932, ISSN: 0034-6748, DOI: 10.1063/1.5119059 [retrieved on Jan. 16, 2020] "I. Introduction".
S. Cisternino, E. Cazzola, H. Skliarova, J. Amico, M. Malachini,, Target manufacturing by Spark Plasma Sintering for efficient 89Zr production, Nuclear Medicine and Biology 104-105 (2022) 38-46, Nov. 1, 2022, Elsevier.
You Zhou, Kiyoshi Hirao, Yukihiko Yamauchi, Shuzo Kanzaki, Densification and grain growth in pulse electric current sintering of alumina, Journal of the European Ceramic Society 24 (2004) 3465-3470, Jan. 1, 2004, Elsevier / Science Direct.

* cited by examiner

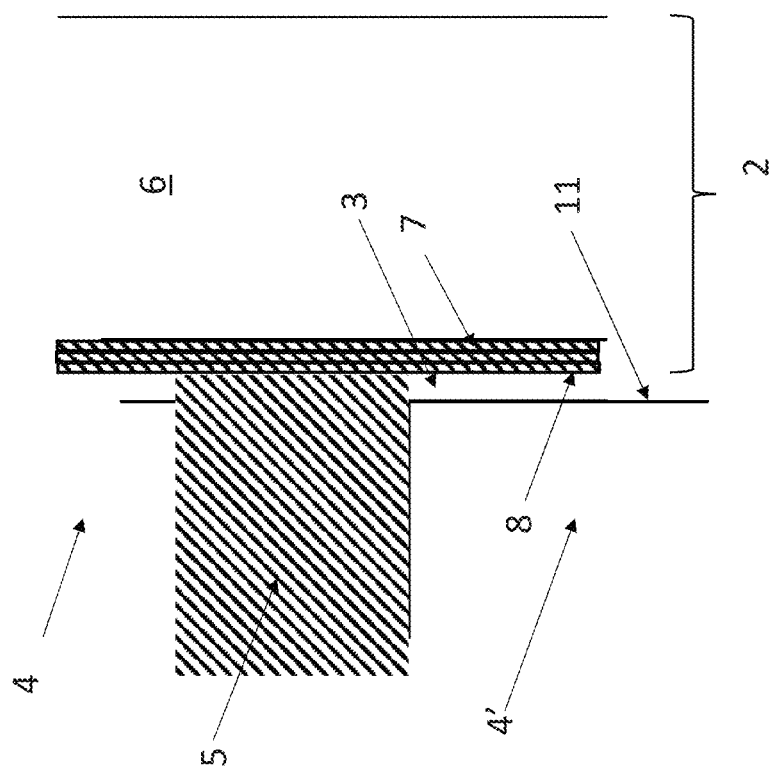

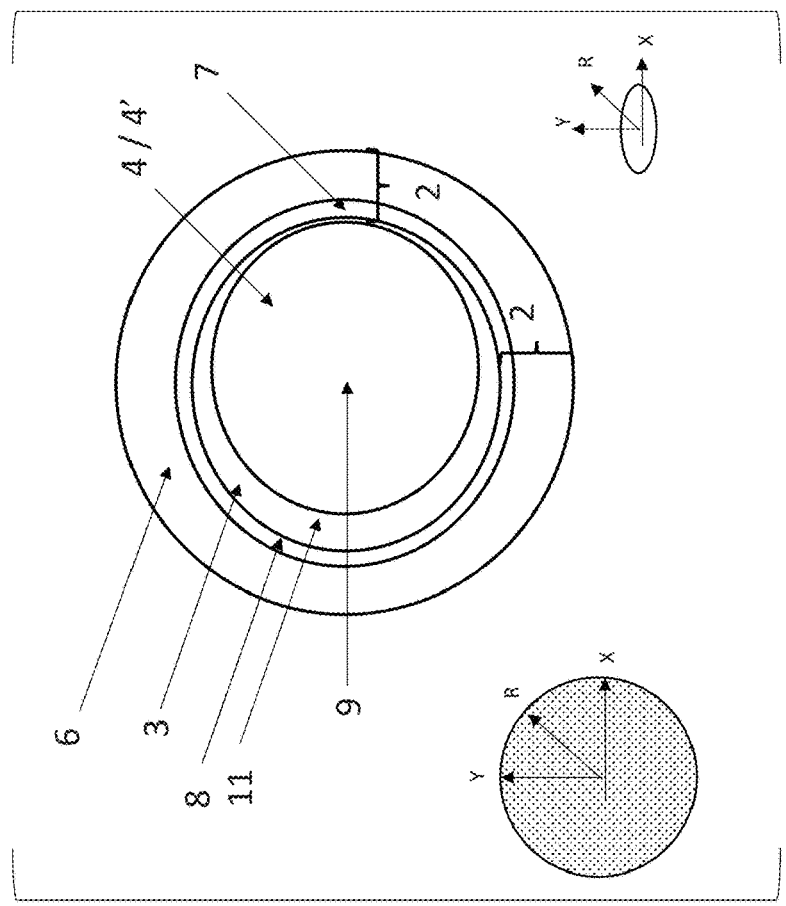
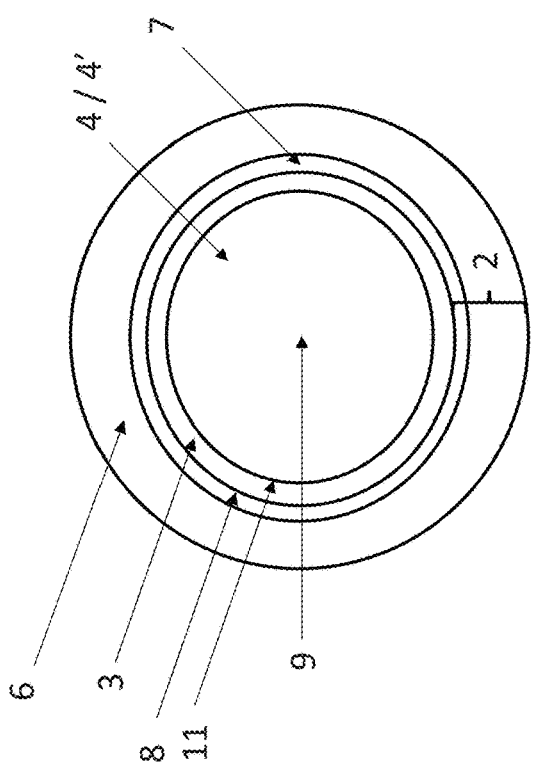
FIG. 4B
FIG. 4A

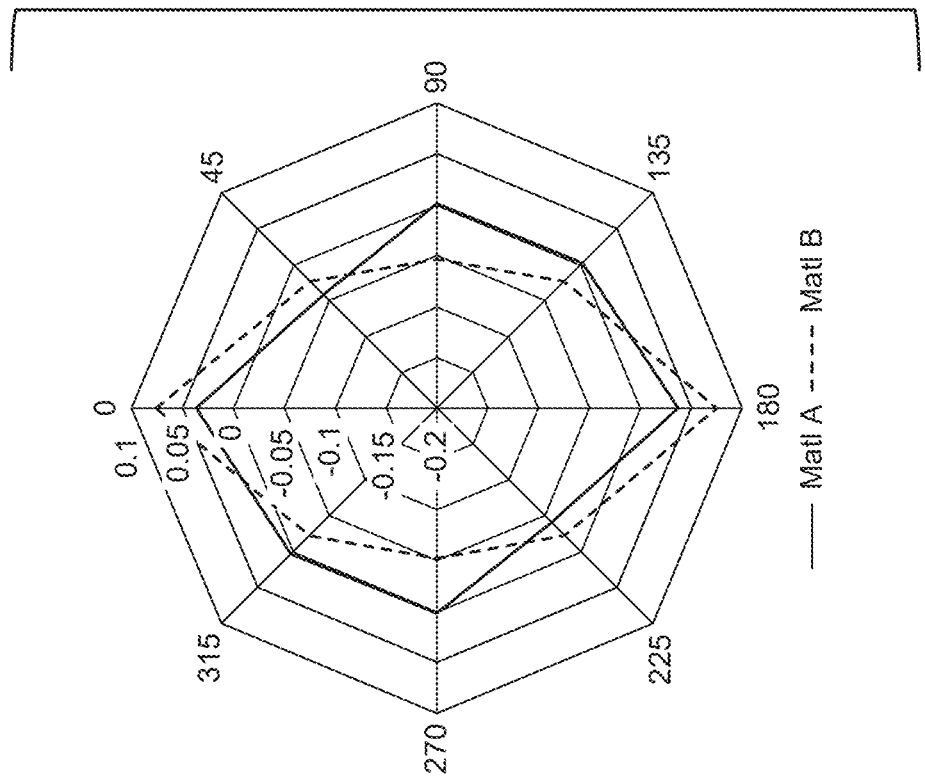
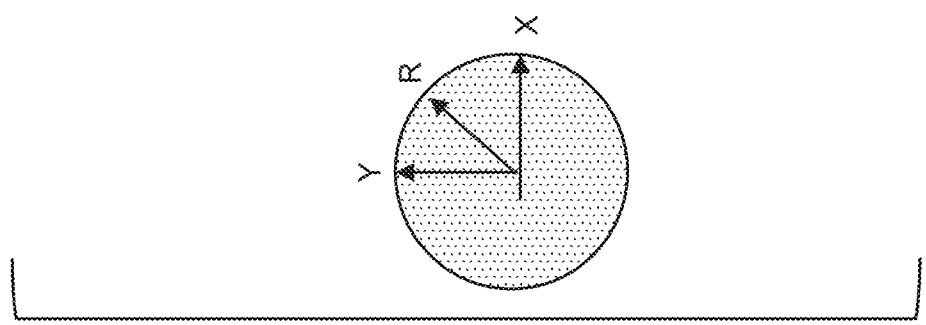
FIG. 5

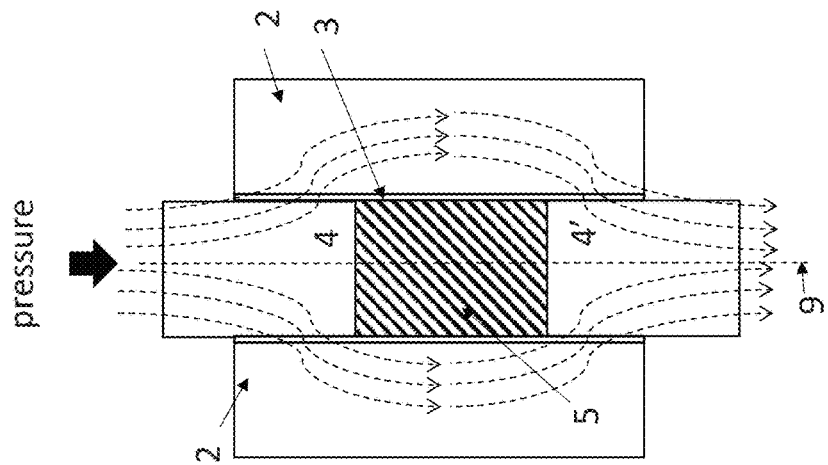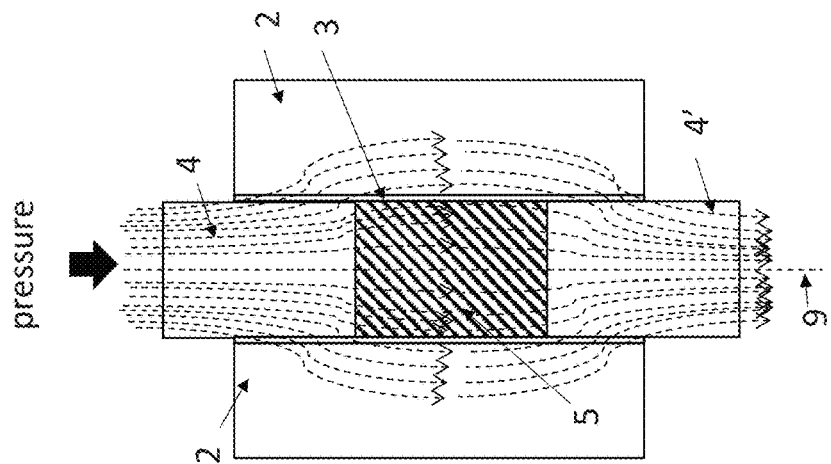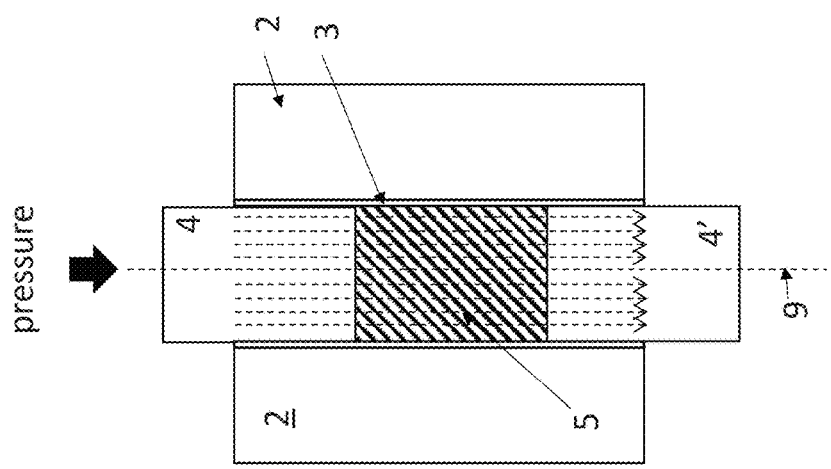

APPARATUS FOR PREPARATION OF SINTERED CERAMIC BODY OF LARGE DIMENSION

FIELD

The present disclosure relates to an apparatus for preparing a sintered ceramic body, in particular a large sintered ceramic body of high purity and high density. Moreover, the present disclosure relates to a specific method of using an apparatus to prepare a large sintered ceramic body, and to computer readable medium storing processor-executable instructions adapted to cause one or more computing devices to operate the apparatus.

BACKGROUND

Ceramics are useful across a variety of industries, such as automotive, aerospace, semiconductor, optics, and medical, among others. Ceramics generally provide high compressive strengths, low thermal expansions, high thermal conductivity, excellent chemical resistance, and favorable dielectric and optical properties. Preparation or fabrication of ceramic parts at large dimensions of about 100 mm to 200 mm and greater proves challenging, however, for a variety of reasons.

Ceramic materials are generally known to be brittle when compared to other materials, such as metals, cermets, and polymers. Therefore, variations in their physical properties and the presence of defects lends them to fracture more readily than other, more ductile materials.

Certain ceramic materials are refractory in nature and difficult to densify. As a result, these materials are typically prepared by pressure-less vacuum sintering in which a ceramic powder is loaded in a furnace and sintered at temperatures of 1,600° C. and greater for extended periods of time, often over several days. This technique often results in a sintered ceramic of unacceptable quality, having lower densities and correspondingly higher porosity, which degrades performance such as chemical etch and/or erosion resistance. These conditions for fabrication also result in large grain sizes, on the order of 20 µm and greater, and lower densities of less than for example about 95% of theoretical, thereby degrading mechanical strength and resulting in breakage at large dimensions, making them unusable for many applications.

In order to promote densification, sintering aids are often used. In applications where high purity across a large body size is required, sintering aids present in the sintered ceramic are incompatible with the end use of the ceramic article and thus preclude their use in applications where high purity, on the order of 99.99% and greater, is required. Sintering aids may also create issues where their specific properties may alter the electrical, magnetic, or other properties in the sintered ceramic in an undesirable manner for the end user.

Other ceramic materials are known to have low sintered strengths, making them particularly difficult to handle at large dimension without breakage. This characteristic prevents their development as structural materials for a variety of applications. Attempts to prepare ceramic materials, in particular those materials known to have low sintered strengths, at large (>100 mm) body sizes often result in breakage during or after sintering, upon cooling, during post-sintering treatments such as annealing or machining, or upon handling as needed for processing.

For semiconductor processing applications, vacuum processing chambers are used for etching and chemical vapor deposition (CVD) of materials on semiconducting substrates. These vacuum processing chambers include components such as disks, rings, liners, and cylinders that confine the plasma over the wafer or substrate being processed. These chamber components, which are typically formed from a variety of plasma-resistant ceramic materials, are continuously attacked by the plasma and, consequently, erode, corrode, and accumulate or release contaminants. This plasma attack causes numerous problems including short component part lifetimes leading to extended tool downtime, increased consumable costs, on-wafer transition metal contamination, process drift, and particle contamination which results in device yield loss.

Because of the erosive and corrosive nature of the plasma environment and the need to minimize particle and/or metal contamination, it is desirable for the ceramic components used in plasma processing chambers to have suitably high erosion and corrosion resistance. Such parts have been formed from materials that provide resistance to corrosion and erosion in plasma environments and have been described, for example, in U.S. Pat. Nos. 5,798,016; 5,911,852; 6,123,791; and 6,352,611. Unfortunately, these examples do not provide direction for the preparation of ceramic materials and components of large dimension, on the order of 200 mm and greater, as required in current semiconductor processing chambers.

The large sintered ceramic bodies prepared so far mainly suffer under the risk of breakage, high porosity, low density, and an insufficient quality/purity for their use in corrosion-resistant applications. Moreover, plasma etch-resistant ceramic components of increasingly large dimension are needed for use in state-of-the-art etch chambers. These requirements currently prevent the application of a host of sintered ceramic components in many plasma processing chambers.

There may be no commercially viable processes for fabrication of large ceramic body components having high (>98% of theoretical) density and minimal (<4% variation) density variation while also having high purities as necessitated by specific applications.

Spark plasma sintering (SPS) technology has been proposed as a solution to fabricate ceramic bodies of large dimension. Also known as field assisted sintering technique (FAST), pulsed electric current sintering (PECS), or plasma pressure compaction (P2C), SPS is densification technology whereby very rapid heating is produced by applying an electrical current (typically pulsed DC) across the ceramic powder contained within a uniaxially loaded conductive die, typically made from graphite. The main characteristic of SPS is that the pulsed or un-pulsed DC or AC current directly passes through the graphite die, as well as the powder compact, in the case of conductive samples. Joule heating has been found to play a dominant role in the densification of powder compacts, which results in achieving near-theoretical density at lower sintering temperature compared to conventional sintering techniques. The heat generation is internal, which facilitates a very high heating or cooling rate (up to 1,000 K/min), hence the sintering process generally is very fast (within a few minutes).

In "Effects of Initial Punch-Die Clearance in Spark Plasma Sintering Process," *Materials Transactions*, Vol. 49, No. 12, pp. 2899 to 2906 (The Japan Institute of Metals 2008), Salvatore Grasso et al. illustrate a typical SPS punch and die assembly. An upper punch and a separate lower punch travel toward and away from each other in an opening defined in a surrounding die. Ideally, the outside diameter of the punches is equal to the inside diameter of the die so that the punches just contact, but slide within, the die. The material to be formed into a part is placed between the two punches and pressure is applied to the punches.

In FIG. 2 of their article, repeated as FIG. 1 (Prior Art) in this document, Grasso et al. illustrate an SPS apparatus 50 including an SPS punch and die assembly 52 located in a vacuum chamber 54. The SPS punch and die assembly 52 acts upon a conductive sample (typically a ceramic powder 5) when a pressure (P) is applied. An SPS power source 56 provides a pulsed or a continuous direct current (for example, up to 5,000 A and, more typically about 1,900 A). A special pressurizing system 58 applies pressure to the punch. The SPS apparatus 50 can be operated automatically, under temperature-control mode (TCM), or manually, under voltage or current-control mode (CCM). Features such as a position measurement 60, an atmosphere control system 62, a water-cooling system 64, and a temperature measurement system 66 can be included. An optical pyrometer 70 is used to measure the outer surface temperature of the die (thermocouples could be used instead) through a glass pane 68. An upper punch electrode 72 and a lower punch electrode 74 deliver high electric current to the upper punch and to the lower punch, respectively, of the SPS punch and die assembly 52. A controller 80 can be used to operate the various components of the SPS apparatus 50.

Attempts to use SPS technology to fabricate parts of large (>100 mm) dimension have thus far been unsuccessful. This lack of success is due at least in part to the inability to control the temperature across larger dimensioned parts during the sintering process, resulting in a temperature gradient during processing. The challenges that arise in producing large ceramic bodies by SPS processes are addressed in two scientific publications by Eugene A. Olevsky et al. in "Fundamental Aspects of Spark Plasma Sintering: I. Experimental Analysis of Scalability" (J. Am. Ceram. Soc., 95 [8], 2406 to 2413 (2012)) and "Fundamental Aspects of Spark Plasma Sintering: II. Experimental Analysis of Scalability" (J. Am. Ceram. Soc., 95 [8], 2414 to 2422 (2012)), which describe the problem arising with the enlargement of the SPS tooling with regards to the temperature gradient. In addition, use of SPS technology to densify those powders or powder mixtures having minimal or no conductivity (i.e., insulators), is particularly challenging due to the inherently low conductivity of the powder, thus exacerbating temperature gradients across the powder during sintering. This temperature gradient results in a variation in material properties such as density and grain size, each of which impact mechanical strength. The inability to control this temperature gradient currently prevents the preparation of ceramic bodies having a large dimension on the order of greater than 100 mm which can be easily handled without breakage.

Japanese Publication No. JP 2004/068089 A discloses a SPS apparatus in which a uniform temperature distribution is provided by optimizing the mold structure. In detail, the shape of the molded product to be sintered is axisymmetric with respect to the central axis of the sintering chamber, and the electrodes of the power supply are mounted at symmetrical positions with respect to the central axis of the sintering chamber. It would be preferable not to have to modify the mold structure.

For these and other reasons, further development is needed of an SPS apparatus for preparing a sintered ceramic body, in particular a large sintered ceramic body of high density and mechanical strength coupled with high purity. In addition, there is the need for a method of using such an apparatus to prepare large sintered ceramic bodies which have a reduced risk of breakage and have a sufficient quality with regards to density and density variation, purity, plasma resistance, and reduced surface roughness.

SUMMARY

To meet these and other needs, and in view of its purposes, the present disclosure provides embodiments of an apparatus and a method for preparing large sintered ceramic bodies with improved mechanical properties and ability to be handled.

Embodiment 1. A spark plasma sintering tool having a central axis and creating sintered ceramic bodies having dimensions of about 100 mm to about 625 mm, the tool comprising: a) a die comprising a sidewall comprising an inner wall and an outer wall, wherein the inner wall has a diameter that defines an inner volume configured to receive at least one ceramic powder having a specific surface area (SSA) of from 1 to 18 $m^2/g$ as measured according to ASTM C1274; and b) an upper punch and a lower punch operably coupled with the die, wherein each of the upper punch and the lower punch have an outer wall defining a diameter that is less than the diameter of the inner wall of the die thereby creating a gap between each of the upper punch and the lower punch and the inner wall of the die when at least one of the upper punch and the lower punch moves within the inner volume of the die, wherein the gap is from 10 μm to 100 μm wide.

Embodiment 2. The spark plasma sintering tool of embodiment 1 wherein the inner wall of the die comprises at least one conductive foil.

Embodiment 3. The spark plasma sintering tool of embodiment 2 wherein the at least one conductive foil comprises graphite, niobium, nickel, molybdenum, or platinum.

Embodiment 4. The spark plasma sintering tool of any one of embodiments 1 to 3 wherein the die, the upper punch, and the lower punch comprise at least one graphite material.

Embodiment 5. The spark plasma sintering tool of embodiment 4 wherein the at least one graphite material has a grain size selected from the group consisting of from 1 to 50 μm, from 1 to 40 μm, from 1 to 30 μm, from 1 to 20 μm, from 5 to 50 μm, from 5 to 40 μm, from 5 to 30 μm, from 5 to 20 μm, from 5 to 15 μm, and from 5 to 10 μm; and the graphite material has a density selected from the group consisting of from 1.45 to 2.0 g/cc, from 1.45 to 1.9 g/cc, from 1.45 to 1.8 g/cc, from 1.5 to 2.0 g/cc, from 1.6 to 2.0 g/cc, from 1.7 to 2.0 g/cc, and from 1.7 to 1.9 g/cc.

Embodiment 6. The spark plasma sintering tool of any one of embodiments 4 to 5 wherein a radial deviation from the average coefficient of thermal expansion of the at least one graphite material varies about the central axis of the tool by at least one amount selected from the group consisting of $0.3 \times 10^{-6}$ ppm/° C. and less, $0.25 \times 10^{-6}$ ppm/° C. and less, $0.2 \times 10^{-6}$ ppm/° C. and less, $0.18 \times 10^{-6}$ ppm/° C. and less, $0.16 \times 10^{-6}$ ppm/° C. and less, $0.14 \times 10^{-6}$ ppm/° C. and less, $0.12 \times 10^{-6}$ ppm/° C. and less, $0.1 \times 10^{-6}$ ppm/° C. and less, $0.08 \times 10^{-6}$ ppm/° C. and less, and $0.06 \times 10^{-6}$ ppm/° C. and less.

Embodiment 7. The spark plasma sintering tool of embodiment 6 wherein the radial deviation from the average coefficient of thermal expansion of the at least one graphite material is maintained across a rotational position of from 0 to 360 degrees with respect to the rotational position of the die and upper and/or lower punches.

Embodiment 8. The spark plasma sintering tool of any one of the preceding embodiments wherein at least one of the upper punch and the lower punch is coupled to an electrode and at least one of the upper punch and the lower punch is in ohmic contact with the die.

Embodiment 9. The spark plasma sintering tool of any one of the preceding embodiments wherein the die, the upper punch, and the lower punch create a homogeneous temperature distribution in the at least one ceramic powder.

Embodiment 10. The spark plasma sintering tool of any one of the preceding embodiments wherein the at least one ceramic powder has a specific surface area (SSA) selected from the group consisting of from 2 to 18 m²/g, from 3 to 18 m²/g, from 4 to 18 m²/g, from 5 to 18 m²/g, from 6 to 18 m²/g, from 1 to 16 m²/g, from 2 to 16 m²/g, from 4 to 16 m²/g, from 6 to 16 m²/g, from 1 to 14 m²/g, from 1 to 12 m²/g, from 1 to 10 m²/g, from 1 to 8 m²/g, from 2 to 12 m²/g, from 2 to 10 m²/g, from 6 to 8 m²/g, and from 3 to 8 m²/g; and the at least one ceramic powder contains less than 100 ppm of total impurities; and the at least one ceramic powder has a resistivity of at least from about $1 \times 10^{+10}$ ohm-cm.

Embodiment 11. The spark plasma sintering tool of embodiment 9 wherein the at least one ceramic powder is selected from the group consisting of yttrium oxide, aluminum oxide, sapphire, yttrium aluminum monoclinic (YAM), yttrium aluminum garnet (YAG), yttrium aluminum perovskite (YAP), zirconium oxide, titanium oxide, cordierite, mullite, cobaltite, magnesium aluminate spinel, silicon dioxide, quartz, calcium oxide, cerium oxide, ferrite, spinel, zircon, nickel oxide, copper oxide, strontium oxide, scandium oxide, samarium oxide, lanthanum oxide, lutetium oxide, erbium oxide, erbium aluminum garnet (EAG), hafnium oxide, vanadium oxide, niobium oxide, tungsten oxide, manganese oxide, tantalum oxide, terbium oxide, europium oxide, neodymium oxide, zirconium aluminate oxide, zirconium silicate oxide, hafnium aluminate oxide, hafnium silicate oxide, titanium silicate oxide, lanthanum silicate oxide, lanthanum aluminate oxide (LAO), yttrium silicate oxide, titanium silicate oxide tantalum silicate oxide, yttrium nitride, yttrium oxynitride, aluminum nitride, aluminum oxynitride, silicon nitride, silicon oxynitride, sialon materials, boron nitride, beryllium nitride, titanium nitride, tungsten nitride, forsterite, steatite, cordierite, mullite, barium titanate, lead titanate, lead zirconate titanate, Mn—Zn ferrite, Ni—Zn ferrite, and sialon.

Embodiment 12. The spark plasma sintering tool of any one of the preceding embodiments further comprising: a vacuum chamber applying a vacuum to the die, the upper punch, and the lower punch; an upper punch electrode connected to the upper punch and a lower punch electrode connected to the lower punch; a power source providing an electric current to the upper punch electrode and to the lower punch electrode; a pressurizing system applying pressure to the upper punch and the lower punch; and a controller operating the various components of the tool.

Embodiment 13. The spark plasma sintering tool of any one of the preceding embodiments wherein the gap is axisymmetric about the central axis.

Embodiment 14. The spark plasma sintering tool of any one of the preceding embodiments wherein the gap is asymmetric about the central axis.

Embodiment 15. The spark plasma sintering tool of any one of the preceding embodiments wherein the gap has a width selected from the group consisting of from 10 µm to 70 µm, from 20 µm to 70 µm, from 30 µm to 70 µm, from 40 µm to 70 µm, from 50 µm to 70 µm, from 60 µm to 70 µm, from 10 to 60 µm, from 10 to 50 µm, and from 10 to 40 µm.

Embodiment 16. A computer readable medium storing processor-executable instructions adapted to cause one or more computing devices to create sintered ceramic bodies having dimensions of about 100 mm to about 625 mm by a method comprising: a) disposing at least one ceramic powder having a specific surface area of from 1 to 18 m²/g as measured according to ASTM C1274 inside an inner volume of a spark plasma sintering tool, wherein the spark plasma sintering tool comprises a die comprising a sidewall comprising an inner wall and an outer wall, wherein the inner wall has a diameter that defines the inner volume, an upper punch and a lower punch operably coupled with the die, wherein each of the upper punch and the lower punch have an outer wall defining a diameter that is less than the diameter of the inner wall of the die thereby creating a gap from 10 µm to 100 µm wide between each of the upper punch and the lower punch and the inner wall of the die when at least one of the upper punch and the lower punch moves within the inner volume of the die; b) moving at least one of the upper punch and the lower punch to apply pressure to the ceramic powder while heating the ceramic powder to a sintering temperature and sintering the ceramic powder to form the sintered ceramic body; and c) lowering the temperature of the sintered ceramic body.

By providing a gap distance between the die system and the punch system it becomes possible to prepare a large sintered ceramic body having excellent mechanical properties.

The embodiments of the invention can be used alone or in combinations with each other.

BRIEF DESCRIPTION OF THE DRAWINGS

The present invention will hereinafter be described in conjunction with the appended figures wherein like numerals denote like elements:

FIG. 3C illustrates another alternative embodiment of FIG. 2 showing three foil layers;

FIGS. 4A and 4B are top plan views of the SPS apparatus of FIG. 2;

FIG. 5 is a graph depicting radial variance in average coefficient of thermal expansion (CTE) about a central axis of graphite Materials A and B at 1,200° C.;

FIG. 8A is cross-sectional view of an SPS apparatus that illustrates sintering of an exemplary ceramic powder having a relatively low resistivity;

FIG. 8B is cross-sectional view of a SPS apparatus that illustrates sintering of an exemplary ceramic powder having a moderate resistivity;

FIG. 8C is cross-sectional view of a SPS apparatus that illustrates sintering of an exemplary ceramic powder having a relatively high resistivity;

DETAILED DESCRIPTION

Figure 1:
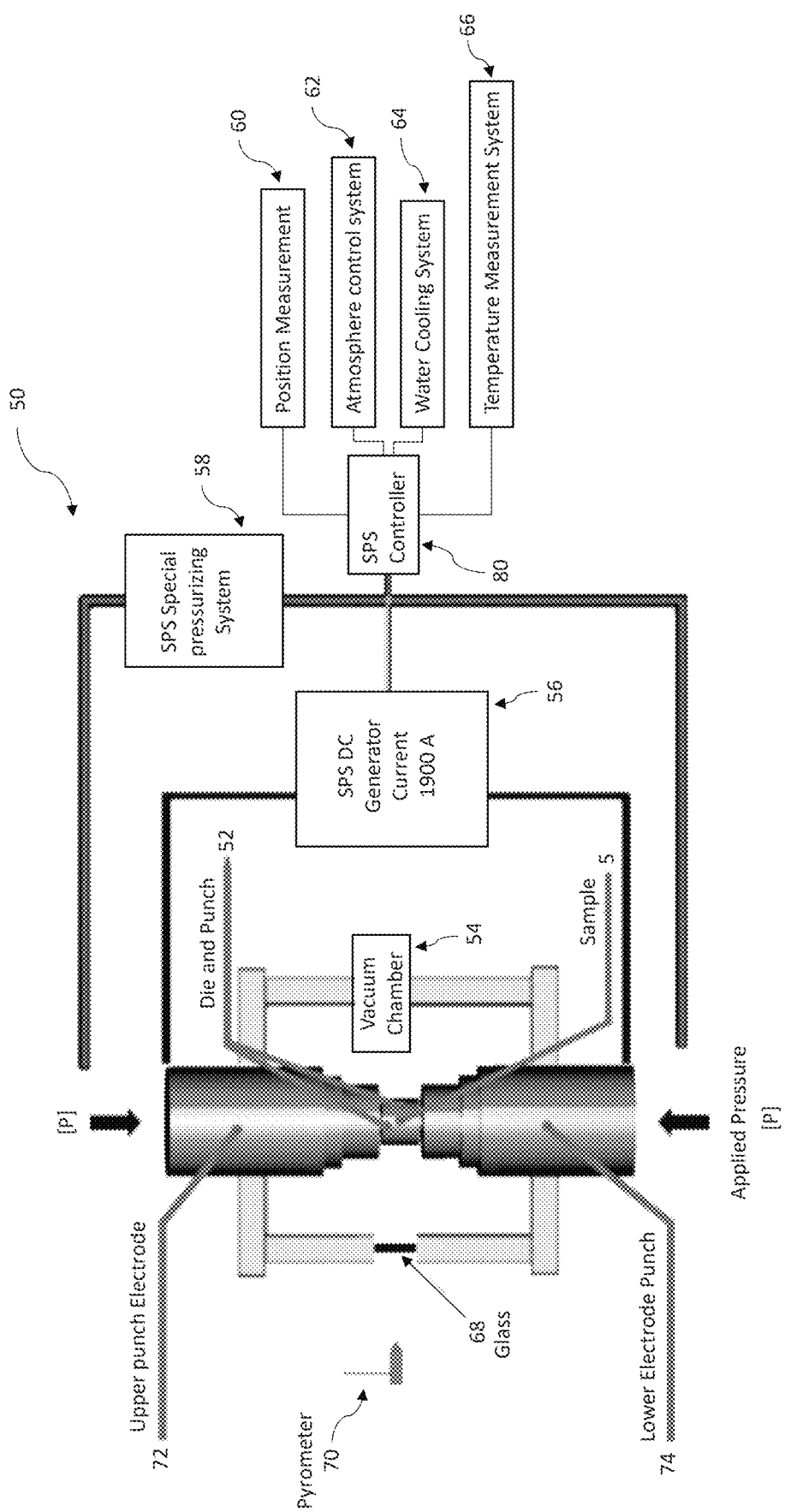
FIG. 1 illustrates an SPS apparatus known in the art.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

Embodiments are described, including the best mode known to the inventors for carrying out the invention. Variations of those embodiments may become apparent to those of ordinary skill in the art upon reading the following detailed description. The inventors expect skilled artisans to employ such variations as appropriate, and the inventors intend for the invention to be practiced otherwise than as specifically described. Accordingly, this invention includes all modifications and equivalents of the subject matter recited in the appended claims as permitted by applicable law. Moreover, any combination of the above-described elements in all possible variations is encompassed by the invention unless otherwise indicated or otherwise clearly contradicted by context. Further, all features disclosed with respect to the methods also apply to the apparatus, a SPS tool as disclosed.

All references, including publications, patent applications, and patents, cited are hereby incorporated by reference to the same extent as if each reference were individually and specifically indicated to be incorporated by reference and were set forth in its entirety.

Definitions

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values is merely intended to serve as a shorthand way to refer individually to each separate value falling within the range, unless otherwise indicated, and each separate value is incorporated into the specification as if it were individually recited. All methods described can be performed in any suitable order unless otherwise indicated or otherwise clearly contradicted by context. The use of any and all examples or exemplary language (e.g., "such as") is intended merely to better illuminate the invention and does not pose a limitation on the scope of the invention unless otherwise claimed. No language in the specification should be construed as indicating any non-claimed element as essential to the practice of the invention. The use of the term "comprising" in the specification and the claims includes the narrower language of "consisting essentially of" and "consisting of."

As used in this document, the term "sintered ceramic body" is synonymous with "body" or "sintered body" and refers to a ceramic article formed from the powder compositions as disclosed upon being subjected to a pressure and heat treatment process which creates a sintered ceramic from the powders as is disclosed. In certain embodiments, the term "sintered ceramic body" may refer to an integral body. By "integral" is meant a single piece or a single unitary part that is complete by itself without additional pieces, i.e., the part is of one monolithic piece formed as a unit with another part.

By "predetermined" is meant determined beforehand, so that the predetermined characteristic must be determined, i.e., chosen or at least known, in advance of some event.

As used in this document, the term "purity" refers to the absence of various contaminants which do not comprise the bulk powder. As example, a purity of 100% indicates the powder comprises only the ceramic material itself.

As used in this document, ambient temperature refers to a temperature of from about 22 to 25° C.

As used herein, ceramic powder refers to one or more powders, or powder combinations to form powder mixtures, which may be milled, mixed, blended, calcined, sieved, etc. according to methods known to those skilled in the art.

As used herein, the term "impurity" refers to those elements, compounds, or other substances present in the starting materials or during processing, from which a sintered ceramic body may be formed, typically considered to be detrimental in application. Impurity contents are measured relative to the total mass of the ceramic powders.

As used in this document, the term "nanopowder" is intended to encompass those powders having a specific surface area (SSA) of 20 m$^2$/g and greater as measured in accordance with ASTM C1274.

The term "calcination" or "calcining" when used as relates to heat treatment processes is understood to mean heat treatment steps which may be conducted on a powder or a powder mixture in air to for example remove moisture and/or surface impurities, increase crystallinity and in some instances modify powder and/or powder mixture surface area.

The term "annealing" when applied to heat treatment of ceramics is understood to mean a heat treatment conducted on the disclosed sintered ceramic bodies in air to a temperature and allowed to cool slowly to relieve stress and/or normalize stoichiometry.

The term "Sa" as known in the art relates to the arithmetical mean height of a surface and represents the absolute value of the arithmetical mean across the surface and is commonly referred to as the "surface roughness". The definition according to ISO 25178-2-2012 section 4.1.7 is the arithmetic mean of the absolute of the ordinate values within a definition area (A).

As used in this document, the terms "substantially," "approximately," and "about" as they are used in connection with numbers allow for a variance of plus or minus 10%.

The term "sintering aid" as used herein refers to additives that enhance densification, and thereby reduce porosity, during the sintering process.

In the following description, given ranges include the lower and upper threshold values. Accordingly, a definition in the sense of "in the range of X to Y" or "in the range from X to Y" of a parameter A means that A can be any value of X, Y and any value from X to Y. Definitions in the sense of "up to Y" or "at least X" of a parameter A means that accordingly A may be any value less than Y and Y, or A may be X and any value greater than X, respectively.

Apparatus/Spark Plasma Sintering Tool

Disclosed is a spark plasma sintering (SPS) tool comprising: a die comprising a sidewall comprising an inner wall and an outer wall, wherein the inner wall has a diameter that defines an inner volume capable of receiving at least one ceramic powder; and an upper punch and a lower punch operably coupled with the die, wherein each of the upper punch and the lower punch have an outer wall defining a diameter that is less than the diameter of the inner wall of the die thereby creating a gap between each of the upper punch and the lower punch and the inner wall of the die when at least one of the upper punch and the lower punch are moved within the inner volume of the die, wherein the gap is from 10 μm to 100 μm wide and the at least one ceramic powder has a specific surface area (SSA) of from 1 to 18 m/g as measured according to ASTM C1274.

Figure 2:
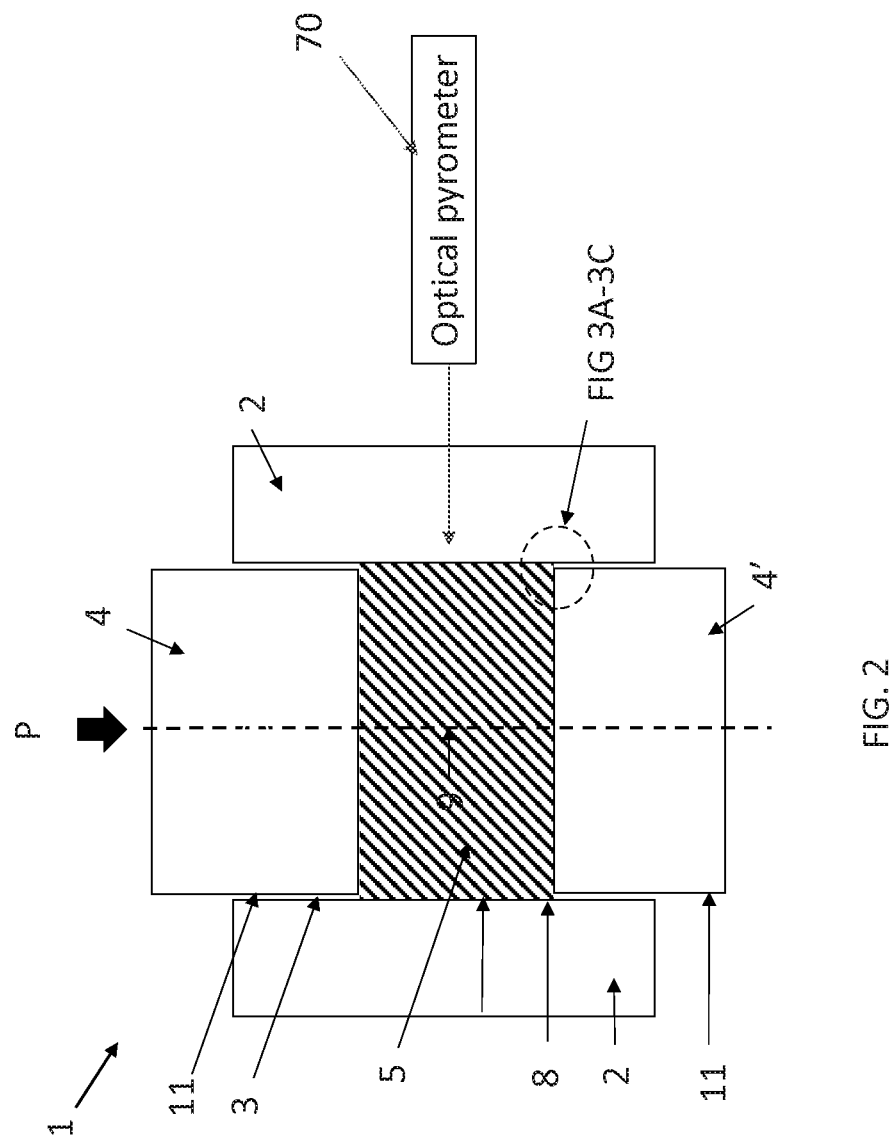
FIG. 2 is a cross-sectional view of a SPS apparatus having a tool set located in a vacuum chamber (not shown) with a simple arrangement used for sintering ceramic materials.

FIG. 2 depicts an SPS apparatus or tool 1 with a simplified die and punch assembly used for sintering ceramic powders. Typically, the die and punch assembly is within the vacuum chamber 54 as will be recognized by one of ordinary skill in the art. Referring to FIG. 2, the SPS tool 1 comprises a die system 2 including a sidewall with an inner wall 8 having a diameter that defines an inner volume capable of receiving at least one ceramic powder 5 that forms the sample S.

Still referring to FIG. 2, the spark plasma sintering tool 1 comprises an upper punch 4 and a lower punch 4' operably coupled with the die system 2, wherein each of the upper punch 4 and the lower punch 4' have an outer wall 11 defining a diameter that is less than the diameter of the inner wall 8 of the die system 2 thereby creating a gap 3 between each of the upper punch 4 and the lower punch 4' and the inner wall 8 of the die system 2 when at least one of the upper punch 4 and the lower punch 4' are moved within the inner volume of the die system 2. The SPS tool 1 has a central axis 9 defining the center of the tool 1.

The dimensions of the upper punch 4, the lower punch 4', and die system 2 can be predetermined according to a particular application. One example of an outer diameter of the die system 2 is about 50 mm and an example of an inner diameter of the die system 2 is about 20 mm. A suitable height for the die system 2 is about 40 mm. The upper punch 4 and the lower punch 4' each have the same outer diameter, predetermined so that the gap 3 between each of the upper punch 4 and the lower punch 4' and the inner wall 8 of the die system 2 is from about 10 μm to 100 μm. Thus, for the example dimensions identified, the outer diameter of the upper punch 4 and the lower punch 4' is from about 19.99 mm, to about 19.95 mm, to about 19.90 mm.

The die system 2 and the upper 4 and lower 4' punches may comprise at least one graphite material, typically a low-strength graphite. Graphite is often used in SPS apparatus as an effective contact material, particularly in sliding conditions, due to its high electric and thermal conductivity, oxidation and wear resistance. In certain embodiments, the graphite material or materials may comprise at least one isotropic graphite material. In other embodiments, the graphite material or materials may comprise at least one reinforced graphite material such as for example a carbon-carbon composite, and graphite materials comprising fibers, particles or sheets or mesh or laminates of other electrically conductive materials such as carbon in a matrix of an isotropic graphite material. In other embodiments, the die system 2 and the upper 4 and lower 4' punches may comprise combinations of these isotropic and reinforced graphite materials.

The graphite materials used for some or all of the parts of the tool 1 such as, for example, the die 6 and/or the punches 4 and 4' may comprise porous graphite materials which exhibit a porosity of from about 5% to about 20%, from about 5% to about 17%, from about 5% to about 13%, from about 5% to about 10%, from 5% to about 8%, from about 8% to about 20%, from about 12% to 20%, from about 15% to about 20%, from about 11% to about 20%, from about 5% to 15%, from 6% to about 13%, and preferably from about 7% to about 12%.

Preferably, the graphite material has an average pore size (pore diameter) of from 0.4 to 5.0 μm, preferably from 1.0 to 4.0 μm and comprises pores with a surface pore diameter of up to 30 μm, preferably up to 20 μm, preferably up to 10 μm. More preferably, pores with a surface pore diameter of from 10 to 30 μm may be present.

Preferably, the graphite material has a surface roughness (Sa), as measured in accordance with ISO 25178-2-2012 section 4.1.7 of less than 5 μm, preferably from 0.5 to 5 μm, preferably from 0.5 to 4 μm, preferably from 0.5 to 3.0 μm preferably from 1 to 5 μm, preferably from 1 to 4 μm preferably from 1.5 to 3.5 μm.

The graphite materials used for the tool 1 may have an average grain size of <0.05 mm, preferably <0.04 mm, preferably <0.03 mm, preferably <0.028 mm, preferably <0.025 mm, preferably <0.02 mm, preferably <0.018 mm, preferably <0.015 mm, and preferably <0.010 mm.

The graphite materials used for the tool 1 may have an average grain size of >0.001 mm, preferably >0.003 mm, preferably >0.006 mm, preferably >0.008 mm, preferably >0.010 mm, preferably >0.012 mm, preferably >0.014 mm, preferably >0.020 mm preferably >0.025 mm and preferably >0.030 mm.

The graphite materials used for the tool as disclosed herein may have a density of $\geq 1.45$ g/cm$^3$, preferably $\geq 1.50$ g/cm$^3$, preferably $\geq 1.55$ g/cm$^3$, preferably $\geq 1.60$ g/cm$^3$, preferably $\geq 1.65$ g/cm$^3$, preferably $\geq 1.70$ g/cm$^3$, and preferably $\geq 1.75$ g/cm$^3$.

The graphite materials used for the tool as disclosed herein may have a density of $\leq 2.0$ g/cm$^3$, preferably $\leq 1.9$ g/cm$^3$, preferably $\leq 1.85$ g/cm$^3$, and preferably $\leq 1.80$ g/cm$^3$.

In embodiments, the graphite materials may have a coefficient of thermal expansion (CTE) across a temperature range from about 400 to about 2,000° C. (or at least, as illustrated in the figures, to about 1200° C.) of $\geq 3.3 \times 10^{-6}/°$ C., $\geq 3.5 \times 10^{-6}/°$ C., $\geq 3.7 \times 10^{-6}/°$ C., $\geq 4.0 \times 10^{-6}/°$ C., $\geq 4.2 \times 10^{-6}/°$ C., $\geq 4.4 \times 10^{-6}/°$ C., $\geq 4.6 \times 10^{-6}/°$ C., $\geq 4.8 \times 10^{-6}/°$ C.

In embodiments, the graphite materials may have a coefficient of thermal expansion (CTE) across a temperature range from about 400 to about 2,000° C. (or at least, as illustrated in the figures, to about 1200° C.) of $\leq 7.2 \times 10^{-6}/°$ C., preferably $\leq 7.0 \times 10^{-6}/°$ C., preferably $\leq 6.5 \times 10^{-6}/°$ C., preferably $\leq 6.0 \times 10^{-6}/°$ C., preferably $\leq 5.75 \times 10^{-6}/°$ C., preferably $\leq 5.5 \times 10^{-6}/°$ C., preferably $\leq 5.0 \times 10^{-6}/°$ C., preferably $\leq 4.8 \times 10^{-6}/°$ C., preferably $\leq 4.6 \times 10^{-6}/°$ C.

In embodiments, the at least one graphite material may have a coefficient of thermal expansion (CTE) at a temperature of from 400° C. to 500° C. of from about $3.8 \times 10^{-6}/°$ C. to about $7 \times 10^{-6}/°$ C., preferably from about $4.0 \times 10^{-6}/°$ C. to about $7 \times 10^{-6}/°$ C., preferably from about $4.4 \times 10^{-6}/°$ C. to about $7 \times 10^{-6}/°$ C., preferably from about $4.0 \times 10^{-6}/°$ C. to about $6 \times 10^{-6}/°$ C.

Table 1 lists properties of exemplary graphite materials as disclosed herein.

TABLE 1

| Property | Range |
| --- | --- |
| Density (g/cc) | 1.45 to 2.0 |
| Average Grain Size (um) | 1 to <50 |
| Resistivity (Ohm- cm) | 0.001 to 0.003 |
| Flexural Strength (MPa) | 40-160 |
| Compressive Strength (MPa) | 80-260 |
| CTE ($\times 10^{-6}$/° C.) at 400° C. to 1400° C. | 3.3 to 7 |
| Porosity % | 5 to 20 |
| Average Pore Diameter (um) | 0.4 to 5 |
| Thermal K (W/m K) | 40-130 |
| Shore Hardness (HSD) | 55 to 59 |
| Tensile Strength (MPa) | 25 to 30 |
| Elastic Modulus (GPa) | 9 to 11 |
| Surface Roughness, Sa (um) | 1 to 5 |
| Impurities/Ash (ppm) | 3 to 500 |

Figure 3A:
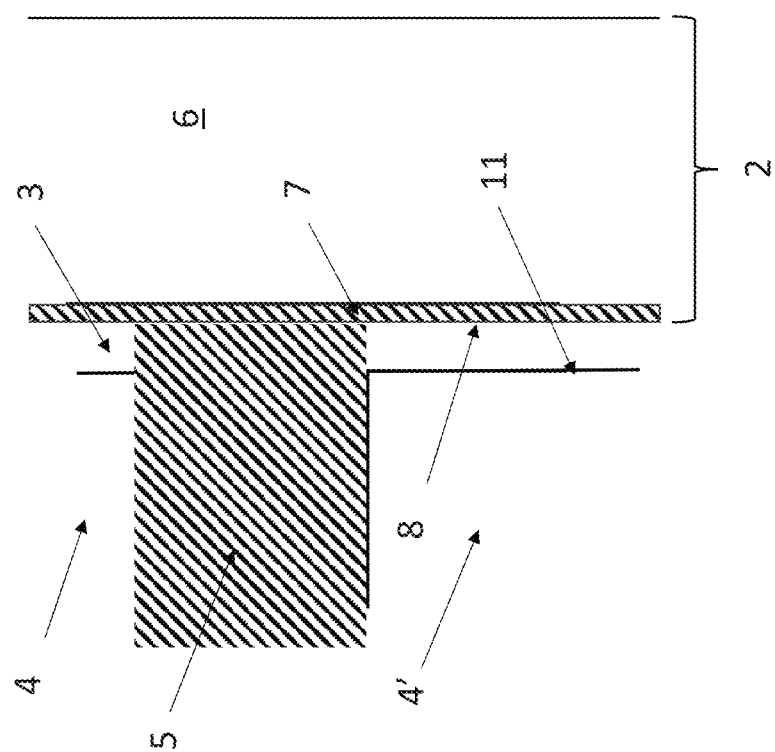
FIG. 3A illustrates an embodiment of FIG. 2 showing one foil layer.
Figure 3B:
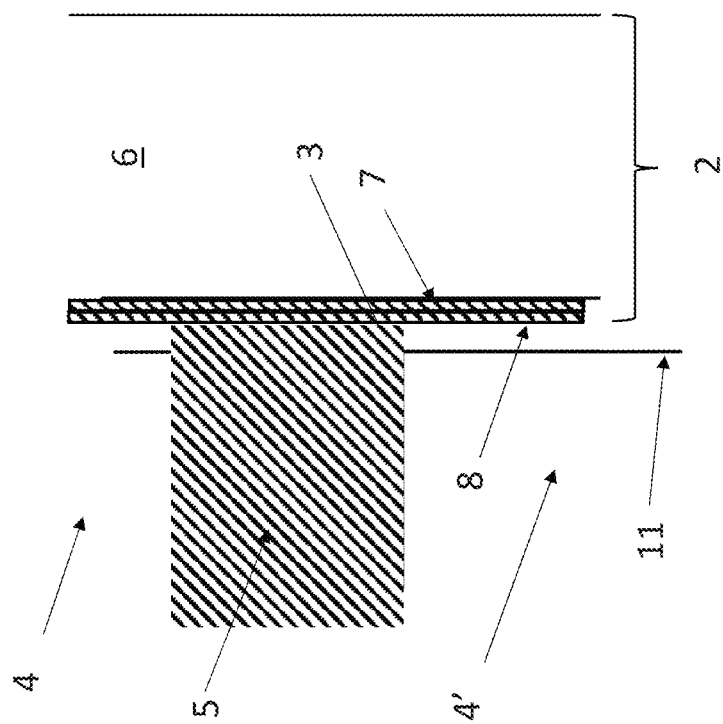
FIG. 3B illustrates an alternative embodiment of FIG. 2 showing two foil layers.

The die system 2 comprises the die 6 and optionally but preferably at least one conductive foil 7 located on the inner wall of the die 6 as depicted in the embodiments of FIGS. 3A, 3B, and 3C. The number of conductive foils 7 on the inner wall of the die 6 is not limited and 1, 2, 3, 4, 5, 6, 7, 8, 9, or 10 conductive foils 7 may be provided as a circumferential liner between the die 6 and each of the upper 4 and the lower 4' punches whereby the inner wall 8 of the die system 2 (including the at least one conductive foil 7, if present) and the outer wall 11 of each of the upper 4 and the lower 4' punches defines the gap 3. The at least one conductive foil 7 may comprise graphite, niobium, nickel, molybdenum, platinum and other ductile, conductive materials and combinations thereof which are stable within the temperature range according to the method as disclosed herein.

In certain embodiments, the conductive foil 7 comprises a flexible and compressible graphite foil as disclosed herein having one or more of the following characteristics:
   carbon content of more than 99 wt %, preferably more than 99.2 wt %, more preferably more than 99.4 wt %, more preferably more than 99.6 wt %, more preferably more than 99.8 wt %, more preferably more than 99.9 wt %, more preferably more than 99.99 wt %, and more preferably more than 99.999 wt %;
   impurities of less than 500 ppm, preferably less than 400 ppm, more preferably less than 300 ppm, more preferably less than 200 ppm, more preferably less than 100 ppm, more preferably less than 50 ppm, more preferably less than 10 ppm, more preferably less than 5 ppm, and more preferably less than 3 ppm, each relative to the total mass of the foil;
   tensile strength of the graphite foil in a range of from 4.0 to 6.0 MPa, preferably from 4.2 to 5.8 MPa, and more preferably from 4.4 or 5.6 MPa; and/or
   bulk density of the graphite foil preferably in a range of from 1.0 to 1.2 g/cc, preferably 1.02 to 1.18 g/cc, more preferably 1.04 to 1.16 g/cc, and more preferably 1.06 to 1.16 g/cc.

In certain embodiments, the conductive foil 7 is pre-determined to compress a certain percentage of its thickness during a specific operation of the tool 1.

In embodiments, the at least one conductive foil 7 typically comprises graphite. In certain embodiments, the at least one conductive foil 7 as part of the die system 2 may comprise a circumferential liner between a surface of the die 6 and each of the upper and lower punches 4, 4'.

The graphite conductive foils 7 may improve the temperature distribution across the ceramic powder 5 during sintering. Table 2 lists properties of exemplary graphite conductive foils 7 according to embodiments as disclosed herein such as Neograf Grafoil®, Sigraflex®, and Toyo Tanso Perma-Foil® graphite foils.

TABLE 2

| | |
| --- | --- |
| Thickness (mm) | 0.030 to 0.260 |
| Density (Mg/m3) | 0.5 to 2 |
| Tensile Strength (MPa) | 4.9-6.3 |
| Resistivity (μOhm-m; 25° C.) (parallel to surface) | 5 to 10 |
| Resistivity (μOhm-m; 25° C.) (perpendicular to surface) | 900 to 1100 |
| CTE ($\times 10^{-6}$/° C.; parallel to surface) at 350° C. to 500° C. | 5 to 5.5 |
| CTE (perpendicular to surface) at 350° C. to 500° C. | $2 \times 10^{-4}$ |
| Compressibility (%) | 40-50 |
| Recovery (%) | 10 to 20 |
| thermal conductivity (W/mK at 25° C.; parallel to surface) | 175 to 225 |
| thermal conductivity (W/mK at 25° C.; perpendicular to surface) | ~5 |
| Impurities/Ash (wt %) | <0.5 |

Referring now to FIGS. 3A, 3B, and 3C, the SPS tool 1 with embodiments of the graphite foil arrangement is shown. The ceramic powder 5 is disposed between at least one of upper and lower punches 4 and 4' and the gap 3 is shown between the outer wall 11 of each of the upper and lower punches 4, 4' and the inner wall 8 of the die system 2. FIGS. 3A, 3B, and 3C depict one, two, and three layers of the conductive foil 7, respectively, and the die 6 as part of the die system 2. Accordingly, the gap 3 extends from the inner wall 8 of the die system 2 to the outer wall 11 of each of the upper and lower punches 4, 4'. The distance, width, or dimension of the gap 3 is predetermined such that the ceramic powder 5 will degas before and/or during heating and sintering, while also maintaining ohmic contact between the upper and lower punches 4, 4' and the die 6 to improve the temperature distribution across the ceramic powder 5 during heating and sintering.

Clearances are joint gaps that exist in a variety of mechanical and electrical applications. They are often inevitable due to machining tolerances. Clearances may also change, however, because of wear, material deformations, or imperfections. Undesired clearances, whether arising from imprecise machining or wear and deformation resulting from extended use, may result in a gap 3 of the tool 1 which is outside of the ranges as disclosed herein. Tools 1 having gaps outside of the disclosed gap 3 ranges produce sintered ceramic bodies which are low in density, high in density variation across for example a diameter of a disc shaped body, and prone to fracture, in particular at large dimension. As such these tools are not useful for the production of large sintered ceramic bodies and once the gap exceeds the ranges as disclosed herein, the tools are removed from further use.

The graphite conductive foils 7 may have a thickness of, for example, from 0.025 to 0.260 mm, preferably from 0.025 to 0.200 mm, preferably from 0.025 to 0.175 mm, preferably from 0.025 to 0.150 mm, preferably from 0.025 to 0.125 mm, preferably from 0.035 to 0.200 mm, preferably from 0.045 to 0.200 mm, and preferably from 0.055 to 0.200 mm.

The distance of the gap 3 is measured from an inwardly facing surface of the foil 7 closest to the upper and lower punches 4 and 4' to the outer wall 11 of each of the upper and lower punches 4 and 4'. Preferred ranges for the distance of the gap 3 are preferably from 10 to 100 μm, preferably from 10 to 80 μm, preferably from 10 to 70 μm, preferably from 10 to 60 μm, preferably from 10 to 50 μm, preferably from 30 to 70 μm, preferably from 20 to 60 μm, and preferably from 30 to 60 μm.

Moreover, the width of the gap 3 between the inner wall 8 of the die system 2 and the outer wall 11 of each of the upper and lower punches 4 and 4' may be pre-determined by the person skilled in the art so that the powder degassing during the preheating, heating and sintering processes is sufficiently facilitated on one hand and that a sufficient electrical contact for Joule or resistive heating and, thereby, sintering is achieved on the other hand. If the distance of the gap 3 is less than 10 µm, the force required to move at least one of the upper and lower punches 4 and 4' within the inner volume of the die system 2, and thereby assemble the tool 1, may cause damage to the punches and or die of the tool 1. Further, if the gap 3 were less than 10 µm then adsorbed gases, organics, humidity and the like within the ceramic powder 5 may not escape, which would extend processing time during manufacturing and may result in residual porosity, and thereby lowered density, in the sintered ceramic body. If the width of the gap 3 is greater than 70 µm when sintering an insulating material such as the oxide ceramics comprising oxide and/or nitride ceramics and non-conducting mixed metal oxides having a high resistivity (on the order of for example about $1\times10^{+10}$ ohm-cm and greater at room temperature), localized overheating may occur, resulting in thermal gradients within the tool 1 during sintering. These thermal gradients may result in low overall bulk density and high density variations and a sintered ceramic body which is fragile and prone to breakage. As a result, in order to form a sintered ceramic body of a large dimension from non-conducting ceramic powders 5 having a high resistivity (and thus low conductivity), a gap 3 of from 10 to 70 µm is preferable. Thus, in some embodiments, the distance of the gap 3 between the inner wall 8 of the die system 2 and the outer wall 11 of each of the upper and lower punches 4 and 4' when sintering ceramic powders 5 comprising insulating oxide or nitride ceramics is preferably from 10 to 70 µm, preferably from 10 to 60 µm, preferably from 10 to 50 µm, preferably from 10 to 40 µm, preferably from 20 to 70 µm, preferably from 30 to 70 µm, preferably from 40 to 70 µm, preferably from 50 to 70 µm, and preferably from 30 to 60 µm. The gap 3 reduces the thermal gradient across a powder compact comprising insulating ceramic powder or powders.

Correspondingly, when the ceramic powder 5 comprises a non-oxide ceramic selected from carbides and borides and specific nitrides such as titanium nitride, each of which may have lower resistivity, and partial conductance, relative to the oxide and nitride ceramics as disclosed herein, on the order of for example from about $1\times10^{-5}$ ohm-cm to about $1\times10^{+10}$ ohm-cm at room temperature, the gap 3 may be larger, for example from about 10 to about 100 µm. This increased gap may be attributed to the partial conductance of the powder or powder compact whereby the partial conductance transmits current and thereby heat through the powder compact thus reducing the thermal gradients across the powder or powder compact comprising the non-oxide ceramics as disclosed. When sintering those ceramic powders 5 having some conductivity and thereby lower resistivity, such as the non-oxide ceramics and/or conductive mixed metal oxides as disclosed herein, a distance of the gap 3 greater than 100 µm may result in localized overheating and thermal gradients within the tool set during sintering. These thermal gradients may result in low overall bulk density and high-density variations and a sintered ceramic body which is fragile and prone to breakage. As a result, the distance of the gap 3 between the inner wall 8 of the die system 2 and the outer wall 11 of each of the upper and lower punches 4 and 4' when sintering the non-oxide ceramics and/or conductive mixed metal oxides as disclosed herein is from 10 to 100 µm, preferably from 10 to 80 µm, preferably from 10 to 60 µm, preferably from 10 to 40 µm, preferably from 20 to 100 µm, preferably from 40 to 100 µm, preferably from 60 to 100 µm, preferably from 30 to 80 µm, and preferably from 40 to 70 µm.

Without intending to be bound by a particular theory, it is believed that the gap distance between the inner wall 8 of the die system 2 and the outer wall 11 of each of the upper and lower punches 4 and 4' during sintering functions to facilitate powder degassing of organics, moisture, adsorbed molecules, etc. during the sintering processes in accordance with step c) of the method as disclosed. This leads to a sintered ceramic body of a large size having high density, low density variation and improved mechanical properties such that the body may be easily handled without breakage and machined into specific forms for fabrication of the sintered ceramic components disclosed herein for use in plasma processing chambers. Sintered ceramic bodies made as disclosed herein may have dimensions of from 100 mm to about 625 mm with regard to the greatest dimension of the sintered ceramic body.

In practice, the upper and lower punches 4 and 4' are not always perfectly aligned about the central axis 9. FIG. 4A and FIG. 4B are plan views of the SPS tool 1, illustrating alignments of upper and lower punches 4 and 4', the gap 3, any number of conductive foils 7, and the die system 2 about the central axis 9. In embodiments as depicted in FIG. 4A, the gap 3 may be axisymmetric about the central axis 9. In other embodiments as depicted in FIG. 4B, the gap 3 may be asymmetric about the central axis, 9. The gap 3 may extend between from 10 µm to 70 µm when sintering the oxide and/or nitride ceramics as disclosed herein and may extend from 10 µm to 100 µm when sintering the non-oxide ceramics as disclosed herein, in both the axisymmetric and asymmetric embodiments as depicted.

Shown in FIG. 4B is a Cartesian coordinate system (X, Y, Z) that specifies each point uniquely in three-dimensional space by three Cartesian numerical coordinates, which are the signed distances to the point from three, fixed, mutually perpendicular directed lines, measured in the same unit of length. Each reference line is called a coordinate axis or just an axis of the system, and the point where they meet is its origin, usually at ordered triplet (0, 0, 0), which would be at the point where the central axis 9 intersects the paper in FIG. 4B. The coordinates can also be defined as the positions of the perpendicular projections of the point onto the three axes, expressed as signed distances from the origin. Using the Cartesian coordinate system, geometric shapes (such as curves) can be described by Cartesian equations: algebraic equations involving the coordinates of the points lying on the shape. For example, as illustrated in FIG. 4B, a circle of radius r, centered at the origin of the plane, may be described as the set of all points whose coordinates x and y satisfy the equation $x^2+y^2=r^2$. The x-y plane is the plane of the paper; the z-axis extends into and out of, and perpendicular to, the paper.

Gap asymmetry performance can be measured by performing an absolute radial coefficient of thermal expansion (CTE) deviation analysis over a range of temperatures. (The CTE describes how the size of an object changes with a change in temperature. Specifically, it measures the fractional change in size per degree change in temperature at a constant pressure.) For example, FIG. 5 shows the radial deviation from the average CTE of two isotropic graphite materials (A and B) which may be used as the punches 4, 4' and/or the die 6 of the apparatus or SPS tool 1 at 1,200° C.

FIG. 5 shows radial deviation in expansion in ppm/° C. relative to the average expansion in the x-y plane of the graphite (expansion in the z direction is not as critical to operation of the tool 1). FIG. 5 shows that for a material to be successful at maintaining the desired gap 3 over a large temperature range, the radial deviation cannot vary from the average CTE in the x-y plane by >0.3×10$^{-6}$/° C. at the maximum from, e.g., room temperature to 2,000° C.

Thus, in order to maintain the desired gap 3 across a temperature range necessary for sintering the insulating ceramic powders having a resistivity of 1×10$^{+10}$ and greater as disclosed herein, the radial deviation from average CTE may preferably be minimized, and as such, the radial deviation is preferably from 0.3×10$^{-6}$/° C. and less, preferably from 0.25×10$^{-6}$/° C. and less, preferably from 0.2×10$^{-6}$/° C. and less, preferably 0.18×10$^{-6}$/° C. and less across a temperature range of interest. In certain embodiments, it may be preferable that radial deviations from the average CTE of 0.16×10$^{-6}$/° C. and less, preferably 0.14×10$^{-6}$/° C. and less, preferably 0.12×10$^{-6}$/° C. and less, preferably 0.1×10$^{-6}$/° C. and less, preferably 0.08×10$^{-6}$/° C. and less, preferably 0.06×10$^{-6}$/° C. and less are maintained to provide the desired gap 3 across a temperature range of from room temperature up to a sintering temperature of the ceramic powder and including up to a working temperature of the apparatus of about 2,000° C. The disclosed ranges of radial deviation from average CTE of the at least one graphite material in the x-y plane are required to be maintained across a rotational position about the central axis 9 of from 0 to 360 degrees, preferably from 0 to 270 degrees, preferably from 0 to 180 degrees, preferably from 0 to 90 degrees, preferably from 0 to 45 degrees, preferably less than 10 degrees, preferably less than 5 degrees, preferably about 3 degrees, and preferably about one degree, each with respect to the rotational position of the die and upper and/or lower punches.

When sintering partially conductive ceramic powders having a resistivity of from about 1×10$^{-5}$ to 1×10$^{+10}$ as disclosed herein, the radial deviation from average CTE may be from 0.5×10$^{-6}$/° C. and less, preferably from 0.4×10$^{-6}$/° C. and less, preferably from 0.3×10$^{-6}$/° C. and less, preferably 0.25×10$^{-6}$/° C. and less, preferably 0.2×10$^{-6}$/° C. and less, preferably 0.18×10$^{-6}$/° C. and less, preferably from 0.16×10$^{-6}$/° C. and less, preferably 0.14×10$^{-6}$/° C. and less, preferably 0.12×10$^{-6}$/° C. and less, preferably 0.1×10$^{-6}$/° C. and less, preferably 0.08×10$^{-6}$/° C. and less, and preferably 0.06×10$^{-6}$/° C. and less. Material B (depicted in dashed lines) displays an unacceptable CTE expansion in the x-y plane whereas Material A exhibited an acceptable CTE expansion in the x-y plane throughout the temperature range. The required ranges for radial deviation from average CTE may apply across a number of different graphite materials having a range of CTE expansions as disclosed herein, without limitation. As such, graphite materials meeting the disclosed ranges for radial deviation may have a CTE ranging for example from 4×10$^{-6}$/° C. to 7×10$^{-6}$/° C. and may be useful for fabrication of the punches 4, 4' and/or die 6. In embodiments, it is preferable that the CTE of the upper 4 and lower 4' punches is less than or equal to the CTE of the die 6. Table 3 lists the maximum radial deviation (max variation in CTE) in the x-y plane, the average CTE, and the standard deviation in CTE of exemplary Material A. The average of the maximum variation in CTE across all temperatures was calculated to be 0.083 ppm/° C.

TABLE 3

| Temperature (° C.) | Maximum Variation in CTE (ppm/° C.) | Average CTE (ppm/° C.) | Standard Deviation CTE (ppm/° C.) |
| --- | --- | --- | --- |
| 200 | 0.077 | 3.357 | 0.030 |
| 400 | 0.059 | 3.543 | 0.028 |
| 600 | 0.064 | 3.843 | 0.027 |
| 800 | 0.092 | 4.069 | 0.033 |
| 1000 | 0.091 | 4.253 | 0.033 |
| 1200 | 0.079 | 4.387 | 0.028 |
| 1400 | 0.120 | 4.513 | 0.044 |

Figure 6B:
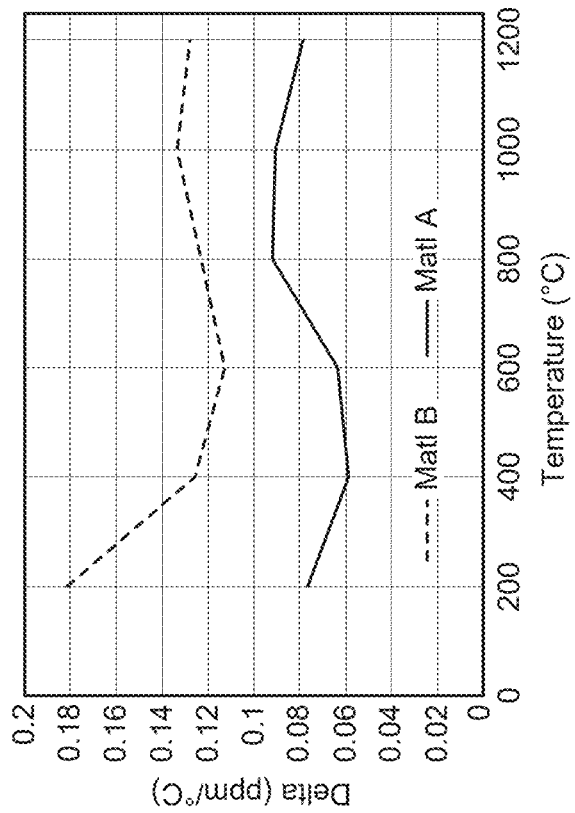
FIG. 6B illustrates the variance in CTE of graphite Materials A and B as measured over the temperatures of from 200 to 1,200° C.
Figure 6A:
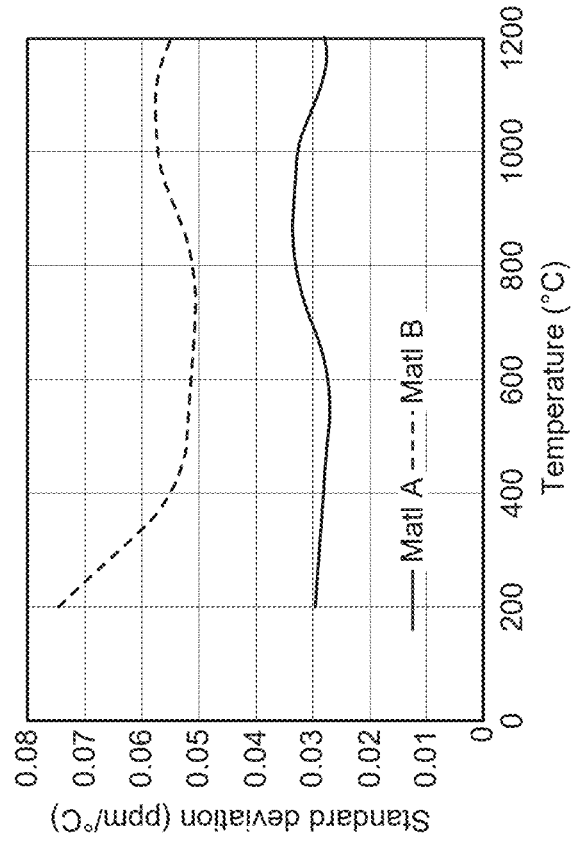
FIG. 6A illustrates the standard deviation of CTE of graphite Materials A and B in ppm/° C. as measured over the temperatures of from 200 to 1,200° C.

FIG. 6A shows the standard deviation in parts per million (ppm/° C.) of the graphite material CTE in the x-y plane of both Materials of FIG. 5 across the range of temperatures. FIG. 6B shows the absolute variation (radial deviation) in CTE (from lowest to highest) in the x-y plane of both Materials of FIG. 5 across the range of temperatures. Preferable are those graphite materials having a lower standard deviation and absolute variation of CTE in the x-y plane.

Figure 7:
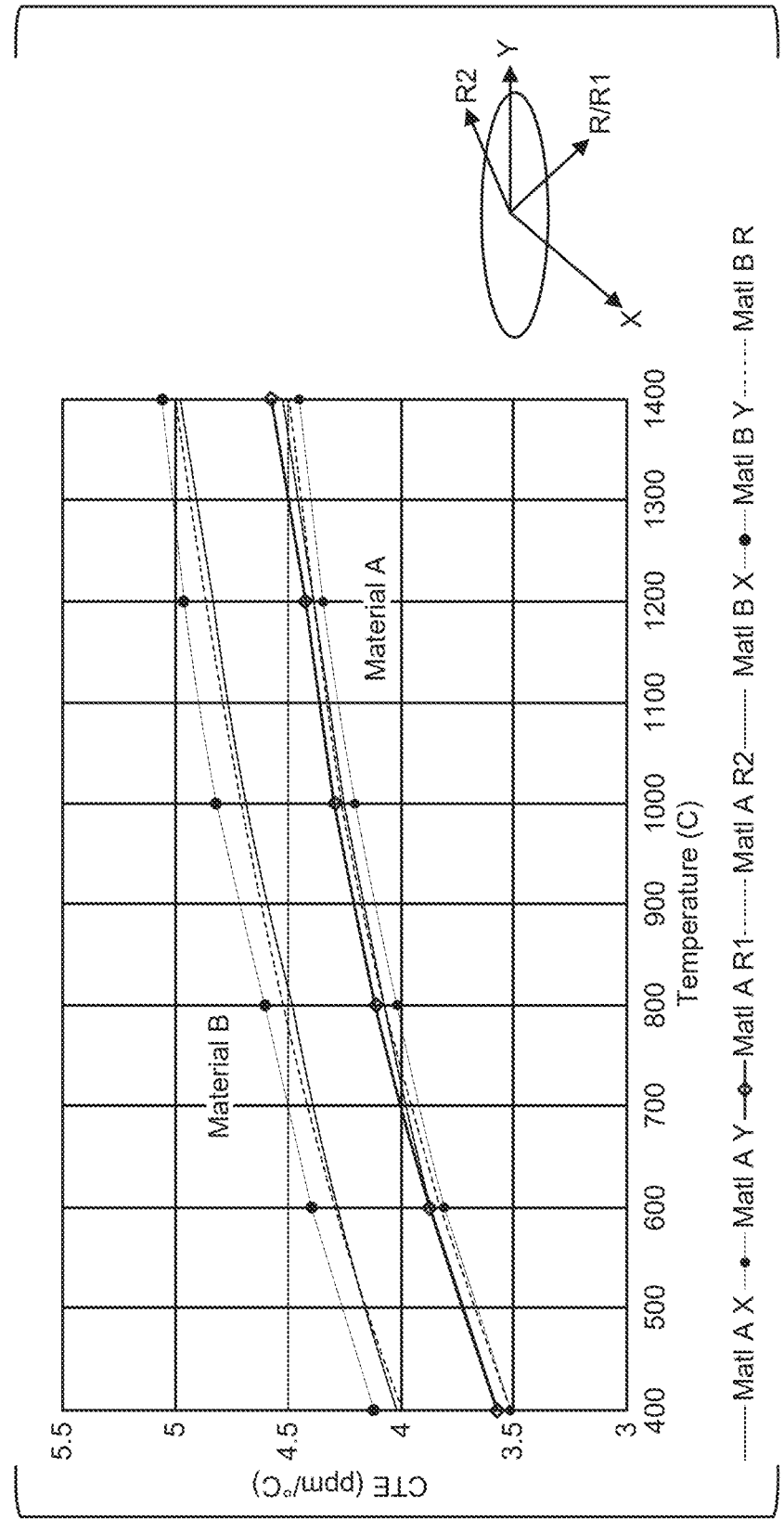
FIG. 7 is a graph illustrating the CTE of graphite Materials A and B from 400 to 1,400° C.

FIG. 7 depicts the variance in CTE of graphite Materials A and B from 400 to 1,400° C., as measured along the x axis, the y axis, a first radius (R or R1), and a second radius (R2). Clearly, Material A is preferred, depicting less CTE variance within the x-y plane of the at least one graphite material. Material B exhibits a greater variation in the CTE within the x-y plane. Although the absolute value of the CTE for the at least one graphite material may vary within the ranges as disclosed herein, it is preferable that the CTE varies within the x-y plane by less than 0.3 ppm/° C., preferably less than 0.25 ppm/° C., preferably less than 0.2 ppm/° C., preferably less than 0.18 ppm/° C., preferably less than 0.13 ppm/° C., preferably less than 0.1 ppm/° C., preferably less than 0.08 ppm/° C. and across a rotational range of the die with respect to each of the upper and lower punches of from 0 to 360, preferably from 0 to 270 degrees, preferably from 0 to 180 degrees, preferably from 0 to 90 degrees, preferably from 0 to 45 degrees, preferably less than 10 degrees, preferably less than 5 degrees, preferably about 3 degrees, and preferably about one degree, each with respect to the rotational position of the die and upper and/or lower punches.

The advantages of the specific SPS tool 1 design used according to an embodiment may lead to the overall technical effect to provide a large ceramic body of very high purity and having a high and uniform density and thereby a reduced tendency towards breakage in the sintering process, in particular in the SPS process, according to the present disclosure. Therefore, all features disclosed with respect to the tool set also apply to the product of a sintered ceramic body of dimension greater than 100 mm.

By using the SPS tool 1 it becomes possible to achieve a more homogeneous temperature distribution in the ceramic powder 5 to be sintered, and make a sintered ceramic body, in particular one of large dimension, exceeding for example 100 mm and/or 200 mm in greatest dimension, having very high density (>98% of theoretical density for a given material) and uniform density (<4% variation across a greatest dimension) and thereby a reduced tendency towards breakage.

The tool set as disclosed may further comprise spacer elements, shims, liners, and other tool set components. Typically, such components are fabricated from at least one of the graphite materials having the properties as disclosed herein.

Method for Preparing Large Sintered Ceramic Bodies

The above-described SPS tool 1 is employed in the following method. As such, all features disclosed with respect to the tool 1 also apply for the method and accordingly all features disclosed with respect to the method also apply for the product of a sintered ceramic body having as a greatest dimension more than 100 mm and even up to 625 mm.

In one embodiment, disclosed is a method of making a sintered ceramic body, the method comprising the following method steps: (a) disposing a ceramic powder inside an inner volume of a spark plasma sintering tool, wherein the spark plasma sintering tool comprises: a die comprising a sidewall comprising an inner wall and an outer wall, wherein the inner wall has a diameter that defines the inner volume; an upper punch and a lower punch operably coupled with the die, wherein each of the upper punch and the lower punch have an outer diameter that is less than the diameter of the inner wall of the die thereby creating a gap between each of the upper punch and the lower punch and the inner wall of the die when at least one of the upper punch and the lower punch are moved within the inner volume of the die, wherein the gap is from 10 μm to 100 μm wide; (b) creating vacuum conditions inside the inner volume; (c) moving at least one of the upper punch and the lower punch to apply pressure to the ceramic powder while heating the ceramic powder to a sintering temperature and sintering the ceramic powder to form the sintered ceramic body; and (d) lowering the temperature of the sintered ceramic body.

The method is characterized in that the SPS tool set described above is located inside a vacuum chamber and comprises at least a die system and upper and lower punches, together defining a volume whereby sintering of the ceramic powder is carried out by disposing the ceramic powder inside the volume defined by the tool set of the sintering apparatus. The die system has an inner wall and the at least one punch system has an outer wall wherein the inner wall of the die system and the outer wall of the punch system are separated by a gap.

Pressure-assisted sintering can be achieved by SPS. Direct current and related techniques employ a direct current to heat up an electrically conductive die configuration, and thereby a material to be sintered is deposited in the die. This manner of heating allows the application of very high heating and cooling rates, enhancing densification mechanisms over grain growth promoting diffusion mechanisms, and transferring the intrinsic properties of the original powders into their near or fully dense products. The SPS method as disclosed herein preferably uses an unpulsed, continuous direct current.

The specific method steps (a) to (d) are now described in detail.

Method Step (a): Disposing a Ceramic Powder Inside a Tool Set of a Sintering Apparatus A ceramic powder is disposed in the die system between the upper and lower punches of the sintering apparatus as described above. A spark plasma sintering apparatus used in the process according to the present technology comprises typically a cylindrical die system. In the die system the ceramic powder is disposed, and the die system filled with the powder is disposed between upper and lower punches.

The ceramic powder to be disposed in the tool for sintering may be, for example, a ceramic powder formed from any metal oxide (oxide ceramic), any metal nitride (nitride ceramic), any combination or mixture of metal oxides (mixed metal oxides), or a ceramic material formed from a non-oxide such as a carbide, a boride as defined herein.

The oxide ceramic may be any metal oxide without limitation. The metal element that forms the oxide ceramic may be one or two or more selected from metalloid elements such as boron (B), silicon (Si), germanium (Ge), antimony (Sb) and bismuth (Bi); representative elements such as magnesium (Mg), calcium (Ca), strontium (Sr), barium (Ba), zinc (Zn), aluminum (Al), indium (In), tin (Sn), transition metal elements such as scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), manganese (Mn), iron (Fe), cobalt (Co), nickel (Ni), copper (Cu), silver (Ag) and gold (Au); and lanthanoid elements such as lanthanum (La), cerium (Ce), praseodymium (Pr), neodymium (Nd), samarium (Sm), europium (Er) and lutetium (Lu). Among others, it is preferable that the metal element is one or more elements selected from Mg, Y, Ti, Zr, Cr, Mn, Fe, Zn, Al, and Er.

More specifically, examples of the oxide ceramic include yttrium oxide, aluminum oxide, yttrium aluminum monoclinic (YAM), yttrium aluminum garnet (YAG), yttrium aluminum perovskite (YAP), zirconia, chromia, titania, cobaltite, magnesia, silica, calcia, ceria, ferrite, spinel, magnesium aluminate spinel, zircon, nickel oxide, silver oxide, copper oxide, zinc oxide, strontium oxide, scandium oxide, samarium oxide, bismuth oxide, lanthanum oxide, lutetium oxide, hafnium oxide, vanadium oxide, niobium oxide, tungsten oxide, manganese oxides, tantalum oxide, terpium oxide, europium oxide, neodymium oxide, tin oxide, antimony oxide, antimony-containing tin oxide, indium oxide, tin-containing indium oxide, zirconium aluminate oxide, zirconium silicate oxide, hafnium aluminate oxide, hafnium silicate oxide, titanium silicate oxide, lanthanum silicate oxide, lanthanum aluminate oxide, yttrium silicate oxide, titanium silicate oxide, tantalum silicate oxide, and mixtures thereof. The oxide ceramics as disclosed herein may have very high electrical resistivities, and thus be non-conducting insulators.

The metal nitride may be any metal nitride without limitation. The metal element that forms the nitride ceramic may be one or two or more selected from metalloid elements such as boron (B), silicon (Si), germanium (Ge); representative elements such as aluminum (Al), indium (In), tin (Sn); transition metal elements such as scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), manganese (Mn), iron (Fe), cobalt (Co), nickel (Ni), copper (Cu), silver (Ag) and gold (Au); and lanthanoid elements such as lanthanum (La), cerium (Ce), praseodymium (Pr), neodymium (Nd), samarium (Sm), europium (Er) and lutetium (Lu). Specific examples of the nitride ceramics include boron nitride, titanium nitride, silicon nitride and aluminum nitride. With the exception of titanium nitride, which is electrically conducting, the nitride ceramics as disclosed herein may have high electrical resistivities, and thus be non-conducting insulators.

The mixed metal oxides may comprise oxides such as forsterite, steatite, cordierite, mullite, barium titanate, lead titanate, lead zirconate titanate, Mn—Zn ferrite, Ni—Zn ferrite and sialon (silicon nitride) and mixtures thereof. These mixed metal oxides may be inherently conducting or insulating, dependent upon composition.

Examples of the non-oxide ceramic include carbides such as tungsten carbide, chromium carbide, vanadium carbide, niobium carbide, molybdenum carbide, tantalum carbide, titanium carbide, zirconium carbide, hafnium carbide, silicon carbide and boron carbide. The non-oxide ceramics comprising carbides as disclosed herein may have moderate electrical resistivities, and thus have a conductivity less than that of metals and greater than that of the oxide and/or nitride and mixed metal oxide ceramics as disclosed herein.

Examples of the non-oxide ceramic include borides such as molybdenum boride, chromium boride, hafnium boride, zirconium boride, tantalum boride and titanium boride or titanium diboride, and titanium nitride. The non-oxide ceramics comprising borides as disclosed herein may have moderate electrical resistivities, and thus have a conductivity less than that of metals and greater than that of the oxide, nitride and mixed metal oxide ceramics as disclosed herein.

The ceramic powders comprising non-oxides such as carbides and borides may have a conductivity between that of the oxide nitrides and mixed metal oxides, and powders comprising metallic materials, having a very low resistivity.

The ceramic powder starting material for carrying out the sintering method as disclosed herein is at least one high-purity commercially available ceramic powder. In embodiments, the ceramic powder disposed within an inner volume of the spark plasma sintering tool may form a uniform, homogeneous-in-composition, sintered ceramic body upon sintering. In other embodiments, a sintered ceramic body comprising one or more layers may be formed from the same ceramic powder or different ceramic powders as desired which are disposed within an inner volume of the spark plasma sintering tool in a layered configuration. Other ceramic powders may also be used, however, for example those produced from chemical synthesis processes and related methods. The purity of the ceramic powder starting material is preferably higher than 99.99%, preferably higher than 99.995%, preferably higher than 99.9975%, preferably higher than 99.999%, preferably more than 99.9995%, and in some embodiments, the purity of the ceramic powder is higher than 99.9999%. In other words, the total impurity level of the ceramic powder may be less than 100 ppm, preferably less than 50 ppm, more preferably less than 250 ppm, more preferably less than 10 ppm, more preferably less than 5 ppm, more preferably about 3 ppm, and still more preferably 1 ppm and less (inclusive of 0 ppm), each relative to the total mass of the ceramic powder starting material. A high-purity ceramic powder starting material is desirable to provide high chemical corrosion and erosion resistance, and thereby minimize particle generation during use as a component in a semiconductor plasma processing chamber.

In contrast to other sintering techniques in the prior art, the ceramic powders employed in the method of the present disclosure do not require sintering aids or organic binders or dispersants and thereby are free of, or substantially free of, sintering aids and/or polymeric binders. In embodiments, the ceramic powders in accordance with the method as disclosed herein may have specific surface areas (SSAs) of 18 $m^2/g$ and less, preferably from 1 to 18 $m^2/g$, typically lower than that of nanopowders, which may have SSAs of from 20 $m^2/g$ to more than 200 $m^2/g$. Use of nanopowders having SSAs in excess of 20 $m^2/g$ which may have greater moisture/humidity and adsorbed gas content, resulting in reduced packing density when forming the powder compact as disclosed herein, may produce a sintered ceramic body having lower densities/higher porosities. Powders having SSAs of less than 1 $m^2/g$ may not result in full densification of the sintered ceramic body due to reduced driving force for sintering from the low powder specific surface area. All measurements of SSA were performed in accordance with as measured in accordance with ASTM C1274, "Standard Test Method for Advanced Ceramic Specific Surface Area by Physical Adsorption." In embodiments, the ceramic powders in accordance with the method as disclosed herein are substantially free of, or free of, nanopowders as defined herein.

Particle sizes of the powders were measured using a Horiba model LA-960 Laser Scattering Particle Size Distribution Analyzer capable of measuring particle size from 10 nm to 5 mm. Specific surface area for the ceramic powders were measured using a Horiba BET Surface Area Analyzer model SA-9601 capable of measuring across a specific surface area of 0.01 to 2000 $m^2/g$ with an accuracy of 10% and less for most samples.

Preferably, the d10 particle size of the ceramic powder used as a starting material in the SPS process disclosed herein may be from 0.05 to 7 μm, preferably from 0.05 to 6 μm, preferably from 0.05 to 5 μm, preferably from 0.05 to 4 μm, preferably from 0.05 to 3 μm, preferably from 0.05 to 1 μm, preferably from 0.1 to 7 μm, preferably from 0.1 to 6 μm, preferably from 0.1 to 5 μm, preferably from 0.1 to 4 μm, preferably from 0.1 to 3 μm, preferably from 0.2 to 6 μm, preferably from 0.3 to 6 μm preferably from 0.4 to 6 μm, and more preferably from 0.3 to 4 μm.

Preferably, the median (d50) particle size of the ceramic powder used as a starting material in the SPS method disclosed herein may be from 0.15 to 100 μm, preferably from 0.15 to 75 μm, preferably from 0.15 to 50 μm, preferably from 0.15 to 25 μm, preferably from 0.15 to 10 μm, preferably from 0.15 to 5 μm, preferably from 0.15 to 3 μm, preferably from 0.8 to 80 μm, preferably from 0.8 to 60 μm, preferably from 0.8 to 40 μm, preferably from 0.8 to 30 μm, preferably from 0.8 to 20 μm, preferably from 0.8 to 10 μm, preferably from 0.8 to 5 μm, preferably from 1 to 100 μm, preferably from 1 to 75 μm, preferably from 1 to 60 μm, preferably from 1 to 45 μm, preferably from 1 to 30 μm, preferably from 1 to 20 μm, preferably from 1 to 10 μm, preferably from 1 to 5 μm, preferably from 10 to 100 μm, preferably from 20 to 100 μm, preferably from 40 to 100 μm, preferably from 10 to 40 μm, preferably from 20 to 40 μm preferably from 30 to 40 μm preferably from 3 to 10 μm, and preferably from 2 to 8 μm.

Preferably, the d90 particle size of the ceramic powder used as a starting material in the SPS method disclosed herein may be from 0.4 to 250 μm, preferably from 0.4 to 100 μm, preferably from 0.4 to 50 μm, preferably from 0.4 to 25 μm, preferably from 0.4 to 10 μm, preferably from 0.4 to 5 μm, preferably from 0.4 to 3 μm, preferably from 0.4 to 1 μm, preferably from 6 to 250 μm, preferably from 6 to 200 μm, preferably from 6 to 160 μm, preferably from 6 to 120 μm, preferably from 6 to 80 μm, preferably from 6 to 40 μm, preferably from 10 to 250 μm, preferably from 20 to 250 μm, preferably from 30 to 250 μm, preferably from 40 to 250 μm, preferably from 10 to 250 μm, preferably from 10 to 140 μm, preferably from 10 to 80 μm, preferably from 3 to 80 μm, and preferably from 10 to 40 μm.

Preferably, the ceramic powder used as a starting material in the SPS method disclosed herein may have a specific surface area of from 1 to 18 $m^2/g$, from 2 to 18 $m^2/g$, preferably from 3 to 18 $m^2/g$, preferably from 4 to 18 $m^2/g$, preferably from 5 to 18 $m^2/g$, preferably from 6 to 18 $m^2/g$, preferably from 1 to 16 $m^2/g$, preferably from 2 to 16 $m^2/g$, preferably from 4 to 16 $m^2/g$, preferably from 6 to 16 $m^2/g$, preferably from 1 to 14 $m^2/g$, preferably from 1 to 12 $m^2/g$, preferably from 1 to 10 $m^2/g$, preferably from 1 to 8 $m^2/g$, preferably from 2 to 12 m²/g, preferably from 2 to 10 m²/g, and preferably from 3 to 8 m²/g as measured according to ASTM C1274.

Preferably, the ceramic powder used as a starting material in the SPS method disclosed herein has a log normal particle size distribution, comprising a continuous distribution of particle sizes. Monomodal and bimodal particle size distributions may result in reduced powder packing density prior to sintering, and thereby reduced density and/or higher density variation across the sintered ceramic body.

Preferably, the ceramic powders used in the SPS method disclosed herein have a low amount of adsorbed gases and/or surface organics, moisture content, entrapped gases and the like. The powder may be optionally subjected to various processing steps such as tumbling, blending, calcining, sieving, etc. as necessary to minimize weight loss relative to total powder weight and thereby minimize porosity in the sintered ceramic body. Table 4 lists total average weight loss upon heating relative to total powder weight across two or more measurements of exemplary ceramic powders. In embodiments, the ceramic powder may have a weight loss relative to total powder weight of from 0.01 to 0.75%, preferably from 0.01 to 0.6%, preferably from 0.01 to 0.45%, preferably from 0.05 to 0.75%, preferably from 0.1 to 0.75%, preferably from 0.2 to 0.75%, preferably from 0.25 to 0.6%, as measured using a thermogravimetric analyser model no. STA PT1600 by Linseis, Inc.

TABLE 4

| Powder | Average Weight Loss (%) |
|---|---|
| alumina | 0.71 |
| alumina | 0.59 |
| alumina | 0.50 |
| alumina | 0.3 |
| alumina | 0.08 |
| aluminum nitride | 0.1 |
| erbium oxide | 0.3 |
| erbium oxide | 0.4 |
| Yag | 0.4 |
| Yag | 0.66 |
| Yag | 0.22 |
| Yag | 0.17 |
| Yag | 0.07 |
| yag | 0.03 |
| yttria | 0.67 |
| yttria | 0.43 |
| yttria | 0.14 |
| yttria | 0.23 |
| yttria | 0.74 |
| zirconia | 0.7 |

In some embodiments, the ceramic powder may be processed in such a way as to remove unwanted moisture, organics or agglomeration. Such processing may include tumbling, calcining and/or sieving and/or blending prior to and/or after its use in step a) of the method disclosed herein.

The ceramic powder may in certain embodiments comprise more than one of the aforementioned oxide, nitride, mixed metal oxide and non-oxide ceramics and combinations thereof which may be mixed in a wet or dry condition in accordance with methods such as ball milling, attrition milling, high shear mixing, planetary milling, jet milling and other procedures as known to those skilled in the art. Powder processing techniques of calcination, drying, sieving, screening, tumbling, blending and similar may be used in accordance with methods as known in the art. For example, ball milling or end over end tumble mixing may be performed as known to those skilled in the art. When a high purity sintered ceramic body is desired, high purity (>99.99%) media may be used in order to preserve the purity of the starting powders during mixing. Wet ball milling or tumble mixing may be performed by suspending the starting powders in various solvents such as ethanol, methanol, and other alcohols, and/or water to form a slurry. The slurry may be formed having a powder loading during milling or mixing of from about 5 to about 50% by powder weight and media loadings of for example from 40 to 100% by powder weight.

In specific embodiments, the ceramic powder may be optionally calcined prior to use in the process of the present development. Exemplary calcination temperatures include temperatures of from about 600° C. to about 1,500° C., preferably from about 700° C. to about 1,500° C., preferably from about 800° C. to about 1,500° C., preferably from about 900° C. to about 1,500° C., preferably from about 1,000° C. to about 1,500° C., preferably from about 600° C. to about 1,300° C., preferably from about 700° C. to about 1,300° C., preferably from about 800° C. to about 1,300° C., preferably from about 900° C. to about 1,300° C., preferably from about 1,000° C. to about 1,300° C., preferably from about 600° C. to about 1,100° C., preferably from about 700° C. to about 1,100° C., preferably from about 800° C. to about 1,100° C., preferably from about 900° C. to about 1,100° C., and preferably from about 1,000° C. to about 1,100° C., for a duration of from 4 to 12 hours, preferably from 4 to 8 hours, preferably from 4 to 6 hours preferably from 6 to 12 hours preferably from 8 to 12 hours, and preferably from 6 to 8 hours in an oxygen containing environment. Before and/or after calcination, the ceramic powder may be sieved and/or tumbled and/or blended according to known methods. The starting ceramic powder/s as disclosed herein are preferably crystalline, and thereby have a long-range crystallographic order and identifiable peaks in x ray diffraction. In certain embodiments, the calcination conditions as disclosed herein may result in agglomeration of the powder mixture and thus greater variability in particle size distributions may result. Thus, in embodiments, the particle size as referred to herein may include a single particle and in other embodiments the particle size as referred to herein may include an agglomerate comprising more than one particle or an agglomeration of multiple particles which may be measured, using the laser particle size detection methods as disclosed herein, as a single, large particle.

In some embodiments, although not required to achieve high density sintered ceramic bodies, sintering aids may be optionally used as desired and combined with the ceramic powder in accordance with the methods and materials as disclosed herein. In specific embodiments, the sintered ceramic bodies may comprise a sintering aid selected from the group consisting of silica, zirconia, calcia, magnesia, and combinations thereof. In certain embodiments, the sintered ceramic bodies may comprise a sintering aid optionally added in amounts of ≥0.002% by weight, preferably ≥0.0035% by weight, preferably ≥0.005% by weight, preferably ≥0.0075% by weight. In other embodiments, the sintering aid may optionally be added in amounts of ≤0.05% by weight, preferably ≤0.03% by weight, and preferably ≤0.02% by weight.

In other embodiments, dopants may be used as desired and combined with the ceramic powder in accordance with the methods and materials as disclosed herein. Dopants of for example a rare earth oxide selected from the group consisting of Sc, La, Er, Ce, Cr, Pr, Nd, Pm, Sm, Eu, Gd, Tb, Dy, Ho, Tm, Yb, and Lu and oxides and combinations thereof in amounts of ≤0.05% by weight, preferably ≤0.03% by weight, preferably ≤0.01% by weight, preferably from 0.002 to 0.02% by weight may be optionally added into the starting ceramic powder/s at step a. In other embodiments, the dopants may be added optionally in amounts of ≥0.002% by weight, preferably ≥0.0035% by weight, preferably ≥0.005% by weight, preferably ≥0.0075% by weight into the ceramic powder of step a).

In further embodiments, both dopants and sintering aids may be optionally combined with the ceramic powder according to the method as disclosed.

In embodiments, sintering may be performed with an isothermal time of from 0.5 to 180 minutes, preferably from 0.5 to 120 minutes preferably from 0.5 to 100 minutes, preferably from 0.5 to 80 minutes, preferably from 0.5 to 60 minutes, preferably from 0.5 to 40 minutes, preferably from 0.5 to 20 minutes, preferably from 0.5 to 10 minutes, preferably from 0.5 to 5 minutes, preferably from 5 to 120 minutes, preferably from 10 to 120 minutes preferably from 20 to 120 minutes preferably from 40 to 120 minutes preferably from 60 to 120 minutes, preferably from 100 to 120 minutes, preferably from 30 to 60 minutes, preferably from 15 to 45 minutes, in other embodiments, sintering under isothermal dwell time may be applied for from 0 to 30 minutes; preferably from 0 to 20 minutes; preferably from 0 to 10 minutes; preferably from 0 to 5 minutes. In certain embodiments, sintering may be performed with an isothermal time of zero, or no isothermal hold time and upon reaching the sintering temperature, a cooling step as disclosed herein is initiated.

Method Step (b): Creating Vacuum Conditions Inside the Inner Volume

Once the ceramic powder is loaded into the die, a pressure of from 5 to 20 MPa, preferably from 8 to 20 MPa, preferably from 10 to 20 MPa, and preferably from 5 to 10 MPa is applied to the ceramic powder disposed inside an inner volume of the spark plasma sintering tool whereby the ceramic powder after application of pressure forms a powder compact which may have a packing density of from 20% to 60% by volume, from 20% to 55% by volume, preferably from 30% to 60% by volume, preferably from 30% to 55% by volume, preferably from 40% to 60% by volume, and preferably from 40% to 55% by volume. Higher packing densities are desirable to improve the thermal conductivity within the powder compact, thereby reducing differences in temperature across the powder compact during heating and sintering. The powder compact is formed from the ceramic powders disclosed herein without the use of organic additives such as dispersants, binders, deflocculants, etc. and therefore is free of, or substantially free of, organics. Thereafter, vacuum conditions as known to those skilled in the art are established within the chamber between the punches surrounded by the die. Typical vacuum conditions include pressures of $10^{-2}$ to $10^{-3}$ torr. The vacuum is applied primarily to remove air to protect the graphite material from burning and to remove a majority of the air from the powder.

Method Step (c): Moving at Least One of the Upper Punch and the Lower Punch to Apply Pressure to the Ceramic Powder while Heating the Ceramic Powder to a Sintering Temperature and Sintering the Ceramic Powder to Form the Sintered Ceramic Body; and Method Step (d): Lowering the Temperature of the Sintered Ceramic Body After the ceramic powder is disposed in the die and a majority of air has been removed from the die/powder, pressure is applied to the ceramic powder disposed between the graphite punches by moving at least one of the upper punch and the lower punch toward the other in an axial direction. The pressure is preferably increased to from 10 MPa to 60 MPa, preferably from 10 MPa to 40 MPa, from 10 MPa to 20 MPa, preferably from 15 MPa to 40 MPa, preferably from 15 MPa to 30 MPa, preferably from 15 MPa to 20 MPa, preferably from 15 MPa to 25 MPa, preferably from 20 to 40 MPa, and preferably from 20 to 30 MPa.

In preferred embodiments, the ceramic powder is heated directly by the punches and die of the SPS apparatus. The die is comprised of an electrically conductive material such as a number of graphite materials as disclosed herein, which facilitates resistive/joule heating. An SPS apparatus and procedures are disclosed in, for example, U.S. Patent Application Publication No. 2010/0156008 A1, which is herein incorporated by reference.

The application of heat to the ceramic powder provided in the die facilitates sintering temperatures from about 1,000 to 1,700° C., preferably from about 1,200 to 1,600° C., preferably from about 1,300 to 1,550° C., preferably from about 1,350 to 1,500° C., and more preferably from about 1,400 to 1,500° C.

FIGS. 8A, 8B, and 8C illustrates the effect of different kinds of ceramic powders on the current path and heating in the SPS tool 1 having a gap 3 as disclosed herein. In FIG. 8A, the ceramic powder 5 is a primarily conductive powder (e.g., a metal powder). Here, the powder resistivity is less than the graphite and the current runs directly from the upper punch 4 through the ceramic powder 5 and into the lower punch 4' rather than extending into the die 6 or the die system 2, facilitating uniform sintering across the ceramic powder 5 disposed between the upper and lower punches 4 and 4'. Thus, for a metal ceramic powder 5, the dimension of the gap 3 is irrelevant to the current path and heating.

In FIG. 8B, the ceramic powder 5 is a partial conductor (e.g., the non-oxide ceramics and/or those mixed metal oxides which are partially conducting as disclosed herein having a resistivity of from about $1 \times 10^{-5}$ to $1 \times 10^{+10}$, for example) and the resistivity of partial conductors may be greater than, on the order of, or less than that of the graphite. In this embodiment, as illustrated in FIG. 8B, the current flows from the upper punch 4 through both the ceramic powder 5 and the graphite of the die 6 or the die system 2, depending upon the resistivity of the powder. Therefore, the size of the gap 3 between the graphite die 6 (or the graphite die system 2) and the upper and lower punches 4 and 4' is preferably from 10 to 100 μm to assure adequate current flow and heating of the ceramic powder 5. The gap in accordance with FIG. 8B is maintained from ambient temperature to a specific sintering temperature for the partially conductive ceramic powder to be sintered, and up to and including a maximum temperature of the apparatus of about 2,000° C.

In FIG. 8C, the ceramic powder 5 is an insulator (e.g., the oxide ceramics, nitride ceramics, and non-conductive mixed metal oxides as disclosed herein) and the current travels from the upper punch 4 only through the graphite die 6 (or the graphite die system 2) and into the lower punch 4' to sinter the ceramic powder 5. In this embodiment, as illustrated in FIG. 8C, no significant electrical current flows through the ceramic powder 5. The at least one ceramic powder 5 according to this embodiment may have a resistivity, for example, of greater than $1 \times 10^{+10}$. A homogeneous temperature distribution, and thereby high and uniform density and low porosity, across the oxide ceramic powder 5 during the sintering process is enabled by the gap distance of from 10 to 70 μm. The gap in accordance with FIG. 8C is maintained from ambient temperature to a specific sintering temperature for the insulating ceramic powder to be sintered, and up to and including a maximum temperature of the apparatus of about 2,000° C.

Temperature gradients in the graphite die 6 (or in the graphite die system 2) and in the upper and lower punches 4 and 4' may be promoted by two concurring phenomena: heat generation and heat conduction. Heat generation may occur either in the bulk or at the contact interfaces. In the SPS tool 1, the latter is mainly controlled by the punch/die contact resistance. The electric contact resistance (Rc) is related to contact area according to the equation Rc=1/ (Ac*$\sigma_G$) where Ac (m$^2$) is the contact area and $\sigma_G$ ($\Omega^{-1}$ m$^{-2}$) is the electrical gap conductance. In electrical applications, the presence of excessive joint gaps can lead to ineffective current flow across the interface. In some circumstances they can even cause arcing. The clearance ratio δ is defined as δ=100%*(D−d)/D where D is the die diameter and d is the punch diameter.

Figure 9:
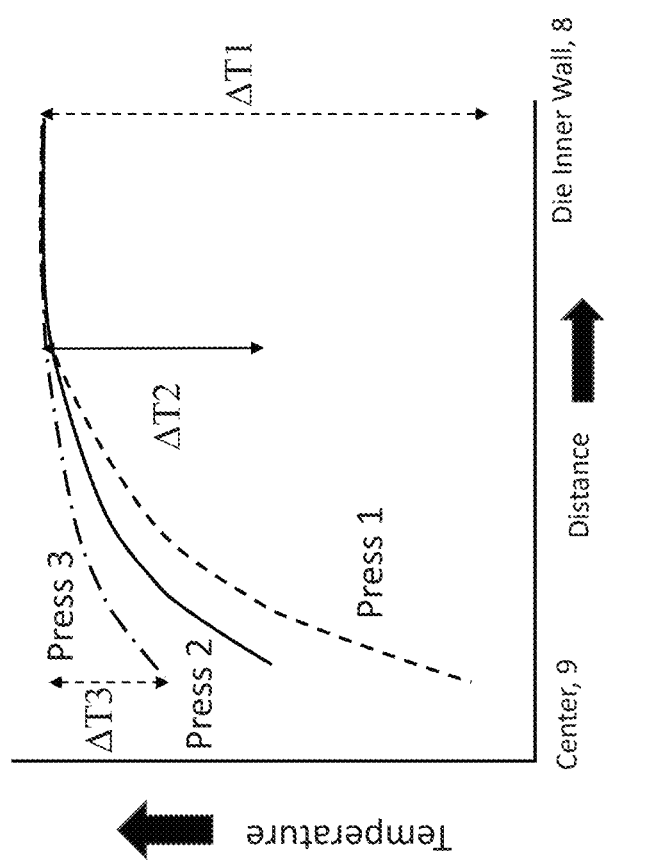
FIG. 9 is a schematic illustrating temperature variance during sintering in the SPS apparatus of FIG. 2.

Referring to FIG. 9, shown is a difference in temperature across a distance between the inner wall 8 of the die system 2 and the central axis 9 of the SPS tool 1. The temperature difference may be less than 100° C., from 1 to 100° C., preferably from 1 to 80° C., preferably from 1 to 60° C., preferably from 1 to 40° C., preferably from 1 to 20° C., preferably from 1 to 10° C., preferably from 5 to 100° C., preferably from 10 to 100° C., preferably from 20 to 100° C., preferably from 5 to 75° C., preferably from 5 to 50° C., and preferably from 5 to 25° C. whereby this temperature differential is thereby applied to the ceramic powder 5 during heating and sintering to achieve a homogeneous temperature distribution across the ceramic powder 5 during sintering. Uniformity in temperature across the powder 5 during sintering poses a greater challenge as the dimensions of the punches and die increase. Thus, uniformity in temperature disclosed at larger dimensions may be more easily achieved at smaller dimensions of the punches and die, thus small (i.e., 25° C. and less, for example) variations in temperature disclosed when sintering larger ceramic bodies may be assumed to vary to at least the same degree or less than that disclosed for smaller ceramic bodies.

The temperature gradient across a greatest dimension of the sintered ceramic body may also be represented by a normalized change in temperature across the greatest dimension. As such, in certain embodiments, a temperature difference across the at least one ceramic powder 5 disposed inside the inner volume defined by the tool set of the sintering apparatus during heating and sintering is from 0.15 to 5° C./cm, preferably from 0.15 to 3° C./cm, preferably from 0.15 to 2° C./cm, preferably from 0.15 to 1° C./cm, preferably from 0.15 to 0.5° C./cm, preferably from 0.4 to 5° C./cm, preferably from 0.4 to 3° C./cm, preferably from 0.4 to 1° C./cm, and preferably from 0.25 to 0.80° C./cm to achieve a homogeneous temperature distribution across the ceramic powder during sintering. The word "homogeneous" means that a material or system has substantially the same property at every point; it is uniform without irregularities. Thus, by "homogeneous temperature distribution" is meant that the temperature distribution is spatially uniform and does not have considerable gradients, i.e., a substantially uniform temperature exists regardless of position in a horizontal x-y plane along the ceramic powder 5. More specifically, by "homogeneous temperature distribution" is meant that the temperature distribution across the at least one ceramic powder 5 disposed inside the inner volume defined by the tool set of the sintering apparatus during heating and sintering is at most from 0.15 to 5° C./cm.

Figure 10:
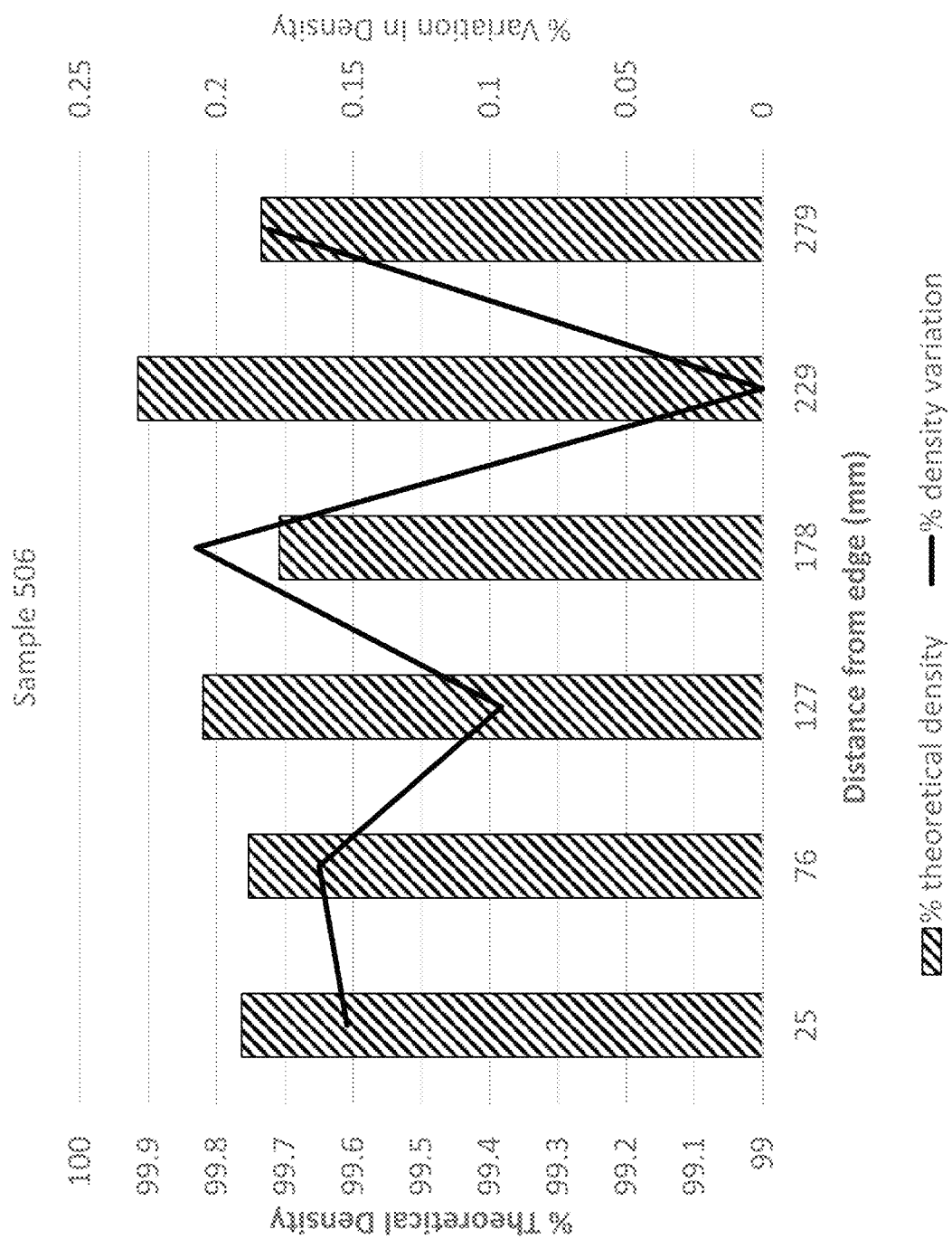
FIG. 10 illustrates the % of theoretical density for a sintered body comprising YAG and the density variation across a greatest dimension for the sintered ceramic body according to Example 2.

FIG. 10 illustrates the percent (%) of theoretical density (reported as 4.556 g/cc) for YAG and the density variation across a greatest dimension for a sintered ceramic body according to Sample 506 of Example 2 as disclosed below. The calcined powder mixture was disposed inside an inner volume defined by the sintering apparatus as disclosed herein wherein the tool had a gap of from about 50 to 70 μm, and vacuum conditions of from $10^{-2}$ to $10^{-3}$ torr were created inside the inner volume. The calcined powder mixture inside the inner volume was heated at 5° C./minute to 800° C., at which temperature a pressure of 5 MPa was applied to form a powder compact having a packing density of from about 40 to 50% by volume, then simultaneously heat was applied at a heating rate of from about 2 to about 3° C./minute and pressure was applied at a rate of from about 0.2 to about 0.25 MPa/minute to reach the sintering conditions of 1,650° C. and 15 MPa for 60 minutes to form a polycrystalline YAG sintered ceramic body in a disc shape having a 622 mm greatest dimension or diameter. Density measurements were performed in accordance with ASTM B962-17 from samples cut across a radius of the sample and the density results are as illustrated in FIG. 10. Five measurements each were taken at six locations along the radius, and an average density of 4.55 g/cc was measured, corresponding to 99.78% of theoretical for YAG. Densities across the radius were from 99.7 to 99.9% of theoretical for YAG. The variation in density as depicted in FIG. 10 was measured relative to the highest density measurement along the radius, and a maximum variation in density of 0.21% was measured. During sintering of the calcined powder mixture, pressure and temperature were applied in a radially symmetric configuration. Thus, properties such as high density (>99% of theoretical for YAG) and minimal density variation (≤0.21%) are maintained across a radius, and also correspondingly across a diameter or greatest dimension of the sintered ceramic body. Thus, disclosed herein is a sintered ceramic body having an average density of 4.546 g/cc, ranging in density across a diameter from 99.7 to 99.9% of the theoretical density for YAG, and having a maximum density variation of 0.21% and less across the diameter of the sintered ceramic body.

By use of the SPS tool set having the range of gap dimensions as disclosed herein whereby the gap is maintained throughout the method and in particular during the sintering step c) of the method as disclosed, resistive overheating is prevented and as a result this difference in temperature may be minimized such that density in the sintered ceramic body has minimal variation across the distance between the inner wall 8 of the die system 2 and the central axis 9. Uniform densification during sintering may result in density variations across a largest dimension of the sintered ceramic body as disclosed herein which are preferably less than 4%, less than 3%, preferably less than 2%, preferably less than 1%, more preferably less than 0.5%, preferably from 0.25 to 5%, preferably from 0.25 to 4%, preferably from 0.25 to 3%, preferably from 0.25 to 2%, preferably from 0.25 to 1%, preferably from 0.25 to 0.5%, preferably from 0.5 to 3.5%, and preferably from 1 to 3%, across a greatest dimension of a sintered ceramic body.

Further contributing to uniform densification during sintering is a high packing density to between 30 and 60% by volume of the powder compact comprising the ceramic powder 5 as disclosed herein prior to sintering, which may be achieved using the ceramic powders and methods as disclosed.

The temperature of the sintering apparatus according to the present disclosure is measured typically within the die comprising at least one graphite material of the sintering apparatus. Thus, it is preferred that the temperature is measured as close as possible to the ceramic powder 5 being sintered so that the indicated temperatures are indeed realized within the ceramic powder 5.

The order of application of pressure and temperature in one embodiment may vary according to the present disclosure, which means that it is possible to apply at first the indicated pressure and thereafter to apply heat to achieve the desired temperature. Moreover, in other embodiments it is also possible to apply at first the indicated heat to achieve the desired temperature and thereafter the indicated pressure. In a third embodiment according to the present disclosure, the temperature and the pressure may be applied simultaneously to the ceramic powder 5 to be sintered and raised until the indicated values are reached.

Inductive or radiant heating methods may also be used for heating the sintering apparatus and indirectly heating the ceramic powder 5 in the tool set.

In contrast to other sintering techniques, preparation of the powder prior to sintering, i.e., by cold pressing or forming a green body using organic additives such as binders, dispersants and the like before sintering is not necessary, and the powder is filled directly inside the inner volume of the SPS tool 1 to form a powder compact without the use of the aforementioned organic additives. This reduced handling may provide for higher purity in the final, sintered ceramic body.

In accordance with aspects of method step c), the temperature and pressure are maintained for a time period of 1 minute to 360 minutes, preferably from 1 to 240 minutes, preferably from 1 to 120 minutes, preferably from 1 to 60 minutes, preferably from 5 to 360 minutes, preferably from 10 to 360 minutes, preferably from 30 to 360 minutes, preferably from 45 to 360 minutes, preferably from 60 to 360 minutes, preferably from 60 to 90 minutes to perform sintering. At the end of step c) of the sintering method, the ceramic powder 5 sintered to form a sintered ceramic body is preferably cooled (step d) in accordance with a natural convection of the method chamber (unforced cooling) until a temperature is reached which may facilitate the optional annealing process of step e). In a further embodiment, the now-sintered ceramic body may be cooled under convection with inert gas, for example, at 1 bar of argon or nitrogen. Other gas pressures of greater than or less than 1 bar may also be used. To initiate the cooling step, the power applied to the SPS tool 1 may be removed. The pressure applied to the sintered sample is removed at the end of the sintering process before (natural) cooling occurs.

A volume reduction of about 30% upon sintering the powder to form the sintered ceramic body may occur, dependent upon the packing density of the ceramic powder 5 prior to the sintering step.

Method Step (e): In an Optional Step, Annealing the Sintered Ceramic Body by Applying Heat to Raise the Temperature of the Sintered Ceramic Body to Reach an Annealing Temperature, and Performing Annealing; and Method Step (f): Lowering the Temperature of the Sintered Ceramic Body to an Ambient Temperature by Removing the Heat Source Applied to the Sintering Apparatus, and Removing the Sintered Ceramic Body In optional step (e), the resulting sintered ceramic body of step d) is subjected to an annealing process. Annealing may be performed in a furnace external to the sintering apparatus, or within the sintering apparatus itself, without removal of the sintered ceramic body from the apparatus. For example, in one embodiment the sintered ceramic body may be removed from the sintering apparatus after cooling in accordance with process step (d), and the process step of annealing may be conducted in a separate apparatus such as a furnace. In other embodiments, for the purpose of annealing in accordance with this disclosure, the ceramic body being formed in step (c) may subsequently be annealed while inside the sintering apparatus, without the requirement of removal from the sintering apparatus between the sintering step (c) and optional annealing step (e).

Annealing leads to a refinement of the chemical and physical properties of the sintered ceramic body. The step of annealing can be performed by conventional methods used for the annealing of glass, ceramics and metals, and the degree of refinement can be selected by the choice of annealing temperature and the duration of time that annealing is allowed to continue.

The optional annealing step (e) can be carried out at a temperature of from 1,200 to 1,800° C., preferably from 1,250 to 1,700° C., and more preferably from 1,300 to 1,650° C. At such temperatures, oxygen vacancies in the crystal structure may be corrected back to stochiometric ratios.

The step of annealing the sintered ceramic body may be completed in from 5 minutes to 24 hours, preferably from 20 minutes to 20 hours, preferably from 60 minutes to 16 hours, preferably from 4 to 12 hours, preferably from 6 to 10 hours.

The optional annealing method step (e) is preferably carried out in an oxidizing atmosphere such as in air.

After the optional method step (e) of annealing the sintered ceramic body is performed, the temperature of the annealed sintered ceramic body is decreased to an ambient temperature in accordance with method step (d) above. The sintered and in certain embodiments annealed ceramic body thus produced is highly dense and typically has an average grain size of from 0.25 µm to 18 µm, preferably from 0.25 to 13 µm preferably from 0.25 to 10 µm, preferably from 0.25 to 8 µm, preferably from 0.25 to 5 µm, preferably from 0.5 to 18 µm, preferably from 0.75 to 18 µm, preferably from 1 to 18 µm, preferably from 2 to 18 µm, preferably from 5 to 18 µm, preferably from 0.5 to 10 µm, preferably from 0.75 to 8 µm, and preferably from 0.75 to 5 µm.

In embodiments, the sintered (and in certain embodiments annealed) ceramic body according to the present disclosure may comprise a non-conductive, metal oxide, nitride or mixed metal oxide, formed from the ceramic powders having the properties as disclosed herein.

In alternate embodiments, the sintered (and in certain embodiments annealed) ceramic body according to the present disclosure may comprise a sintered ceramic body formed from a mixed metal oxide, such as forsterite, steatite, cordierite, mullite, barium titanate, lead titanate, lead zirconate titanate, Mn—Zn ferrite, Ni—Zn ferrite and sialon, and mixtures thereof, having the properties as disclosed herein. Mixed metal oxides as disclosed herein may be conducting or insulating and formed according to the specific gap width, apparatus and methods as disclosed.

The SPS method according to one embodiment and described above is suitable for use in the preparation of large sintered ceramic bodies having a greatest dimension of 100 mm and greater. The method as disclosed provides for rapid powder consolidation and densification, retaining a small (on the order of less than 18 µm) average grain size in the sintered body, in some embodiments transferred from the particle size of the starting ceramic powders, and achieving high densities in excess of 98% of theoretical density of a specific material with a density variation across a greatest dimension of <4%. This combination of fine grain size, uniform and high density provides for a high strength sintered ceramic body of large dimension suitable for machining, handling and use as a component in a semiconductor processing chamber. As such, according to certain embodiments, the sintered (and in certain embodiments annealed) ceramic body according to the present disclosure may comprise a metal oxide, metal nitride, metal carbide, metal boride, or a mixed metal oxide having a diameter of more than 100 mm having the properties as disclosed herein.

For example, in an embodiment, the sintered (and in certain embodiments annealed) ceramic body may be formed from the powders as disclosed herein in a disk shape having a dimension from 40 mm to 625 mm in size and across a range of thicknesses, from about 3 mm to about 60 mm, preferably from 5 to 50 mm in thickness. In another embodiment, the sintered (and in certain embodiments annealed) ceramic body may be formed in a disk shape having a diameter from 100 mm to 625 mm in diameter. In an alternate embodiment, the sintered (and in certain embodiments annealed) ceramic body may be formed having a greatest dimension from 100 mm to 406 mm. In other embodiments, the sintered (and in certain embodiments annealed) ceramic body has a size of from 200 mm to 625 mm, preferably from 300 to 625 mm, preferably from 350 to 625 mm, preferably from 400 to 625 mm, more preferably from 450 to 625 mm, more preferably from 500 to 625 mm, and more preferably 550 to 625 mm, each with regard to a greatest dimension of the sintered ceramic body.

Finally, the sintered (or sintered and annealed) ceramic body may then be optionally machined into, for example, a final component for use in a plasma processing chamber such as, for example, a dielectric window or RF window, a focus ring, a nozzle or a gas injector, a shower head, a gas distribution plate, an etch chamber liner, a plasma source adapter, a gas inlet adapter, a diffuser, an electronic wafer chuck, a chuck, a puck, a mixing manifold, an ion suppressor element, a faceplate, an isolator, a spacer, and a protective ring. Machining of the sintered ceramic body (or sintered and annealed) to create a sintered component may be carried out according to methods known to those skilled in the art.

The method as disclosed herein provides for a high density and related low porosity, minimal density variation, high purity, high mechanical strength and thereby handleability of a sintered ceramic body/component, in particular, for those bodies of dimensions greater than, for example, from 100 to 625 mm across a maximum dimension. All features disclosed with respect to the method also apply to the product of a sintered ceramic body as disclosed herein.

The present disclosure also provides computer-implemented methods, computer programs, computer systems, and the controller 80 in the SPS tool 1 for preparing a large sintered ceramic body. Each of the method steps can be carried out by a computing device, such as a computer or controller 80. In some embodiments, all of the method steps are carried out by the controller 80. The methods may be implemented in software, hardware, firmware, or any combination thereof. In some embodiments, the methods are implemented in one or more computer programs executing on a programmable computer system including at least one processor, a storage medium readable by the processor (including, e.g., volatile and non-volatile memory and/or storage elements), and input and output devices. The computer system may comprise one or more physical machines or virtual machines running on one or more physical machines. In addition, the computer system may comprise a cluster of computers or numerous distributed computers that are connected by the Internet or other network.

Each computer program can be a set of instructions or program code in a code module resident in the random access memory of the computer system. Until required by the computer system, the set of instructions may be stored in another computer memory (e.g., in a hard disk drive, or in a removable memory such as an optical disk, external hard drive, memory card, or flash drive) or stored on another computer system and downloaded via the Internet or other network. Each computer program can be implemented in a variety of computer programming languages.

The disclosed methods (including computer-implemented methods), computer programs, computer systems, and apparatus for preparing a large sintered ceramic body each recite, as a whole, an abundance of steps and elements well beyond an abstract idea. As an initial matter, the methods, programs, systems, and apparatus each teach a specific rules-based approach for preparing a large sintered ceramic body. The methods, programs, systems, and apparatus each teach an ordered combination, with specific requirements defined by individual steps and elements. The specific, disclosed steps and elements of these rules are not widely prevalent, and their combination is not a well understood, routine, conventional activity. Rather, the specific, disclosed steps and elements of these rules allow for the improvement realized by the disclosed methods, programs, systems, and apparatus.

Further, one focus of the disclosed methods, programs, systems, and apparatus is on the specific asserted improvement in computer capabilities; they improve the functioning of a computer itself. The improvements to a computer relevant to this disclosure include software improvements to logical structures and processes. Much of the advancement made in computer technology consists of improvements to software that, by their very nature, may not be defined by particular physical features but rather by logical structures and methods. The specific steps and elements of the disclosed methods, programs, systems, and apparatus constitute a specific type of data structure designed to improve the way a computer stores and retrieves data in memory. The disclosed methods, programs, systems, and apparatus are directed to improving the functioning of a computer and improving the technological task of preparing a large sintered ceramic body. It is the incorporation of the disclosed steps and elements, not the use of the computer, that has improved the existing technological task. Improvements in computer-related technology are not limited to improvements in the operation of a computer or a computer network per se but may also comprise a set of "rules" (basically mathematical relationships) that improve computer-related technology.

Still further, the disclosed methods, programs, systems, and apparatus enable a computing device to do things it could not do before, such as preparing a large sintered ceramic body (dimensions of from 100 mm to 625 mm with regard to the greatest dimension of the sintered ceramic body) having high density, low density variation and improved mechanical properties such that the body may be easily handled without breakage. The disclosed methods, programs, systems, and apparatus provide a solution that is necessarily rooted in computer technology in order to overcome a problem specifically arising in the realm of preparing a large sintered ceramic body. As explained, the disclosed methods, programs, systems, and apparatus teach a specific approach for overcoming the computational limitations of the existing methods, programs, systems, and apparatus used to prepare a large sintered ceramic body. The disclosed methods, programs, systems, and apparatus overcome the deficits of the existing methods, programs, systems, and apparatus by at least accurately and efficiently preparing a large sintered ceramic body in a specific, novel, and non-obvious way.

The present disclosure also provides computer readable medium storing processor-executable instructions adapted to cause one or more computing devices to operate the apparatus or tool 1 by:

a. disposing at least one ceramic powder having a specific surface area of from 1 to 18 m$^2$/g as measured according to ASTM C1274 inside an inner volume of a spark plasma sintering tool, wherein the spark plasma sintering tool comprises a die including a sidewall having an inner wall and an outer wall, wherein the inner wall has a diameter that defines the inner volume, an upper punch and a lower punch operably coupled with the die, wherein each of the upper punch and the lower punch have an outer wall defining a diameter that is less than the diameter of the inner wall of the die thereby creating a gap from 10 μm to 100 μm wide between each of the upper punch and the lower punch and the inner wall of the die when at least one of the upper punch and the lower punch moves within the inner volume of the die;

b. moving at least one of the upper punch and the lower punch to apply pressure to the ceramic powder while heating the ceramic powder to a sintering temperature and sintering the ceramic powder to form the sintered ceramic body; and c. lowering the temperature of the sintered ceramic body.

The computer readable medium storing processor-executable instructions are optionally adapted to cause one or more computing devices to operate the apparatus or tool 1 by:

d. annealing the sintered ceramic body by applying heat to raise the temperature of the sintered ceramic body to reach an annealing temperature, performing annealing;

e. lowering the temperature of the sintered and annealed ceramic body to an ambient temperature by removing the heat source applied to the sintered yttrium oxide body; and f. machining the sintered and annealed ceramic body to create a sintered ceramic component, wherein the component is selected from the group consisting of a dielectric window or RF window, a focus ring, a nozzle or a gas injector, a shower head, a gas distribution plate, an etch chamber liner, a plasma source adapter, a gas inlet adapter, a diffuser, an electronic wafer chuck, a chuck, a puck, a mixing manifold, an ion suppressor element, a faceplate, an isolator, a spacer, and a protective ring.

EXAMPLES

The following examples are included to more clearly demonstrate the overall nature of the disclosure. These examples are exemplary, not restrictive, of the disclosure.

All particle size measurements were performed using a Horiba model LA-960 Laser Scattering Particle Size Distribution Analyzer capable of measuring particle size from 10 nm to 5 mm. All specific surface area (SSA) measurements for the starting powders, powder mixtures, and calcined powder mixtures were performed using a Horiba BET Surface Area Analyzer model SA-9601 capable of measuring across a specific surface area of 0.01 to 2000 m$^2$/g with an accuracy of 10% and less for most samples. Purities and impurities were measured using an ICP-MS from Agilent 7900 ICP-MS model G8403. All density measurements were performed in accordance with ASTM B962-17, based upon Archimedes methods as known to those skilled in the art. Embodiments of the oxide powders and ceramics formed therefrom according to Examples 1 to 4 are known to be inherently insulating, highly resistive materials having a resistivity of from about 1×10$^{+10}$ ohm-cm and greater.

The terms "apparatus" and "tool" are used interchangeably in reference to the spark plasma sintering apparatus.

Comparator Example 1

A polycrystalline ceramic sintered body of 406 mm largest dimension was prepared from a crystalline powder of yttrium oxide having a specific surface area of from 4.5 to 6.5 m$^2$/g, and a d10 particle size of from 1.5 to 3.5 μm, a d50 particle size of from 4 to 6 μm, and a d90 particle size of 6.5 to 8.5 μm. The powder had total impurities of about 14 ppm relative to a total mass of the yttrium oxide powder. A die of a spark plasma sintering tool was lined with at least one graphite foil having properties as disclosed herein, and the die and each of the upper and lower punches of the tool comprised at least one graphite material as disclosed herein. The powder was disposed inside an inner volume defined by the spark plasma sintering tool and the tool had a gap of about 100 μm. The gap was configured between an inwardly facing surface of the at least one graphite foil and an outer wall of each of the upper punch and the lower punch of the spark plasma sintering tool. Vacuum conditions of from 10$^{-2}$ to 10$^{-3}$ torr were created inside the inner volume. The powder was sintered at 1,400° C. at a pressure of 20 MPa for a duration of 30 minutes to form a sintered ceramic body in a disc shape having a greatest dimension, or diameter, of 406 mm. The overall density of the sample was measured as 4.78 g/cc, or 95.03% of the theoretical density for yttrium oxide (reported as 5.03 g/cc). A density variation was measured to be about 4.5% relative to the highest density measurement across the greatest dimension. The sintered ceramic body prepared using the spark plasma sintering tool having a gap as disclosed in accordance with this example resulted in low overall density, high density variation, and subsequent fracture of the sintered body.

Comparator Example 2 (Sample 363)

High purity (>99.99%) yttrium oxide and aluminum oxide powders were combined to form a powder mixture in a molar ratio to form a sintered ceramic body comprising the yttrium aluminum garnet (YAG) phase upon sintering. After wet tumble mixing performed as known to those skilled in the art, the powder was calcined at 1,000° C. for 10 hours. The calcined powder mixture had a specific surface area (SSA) of from about 3.5 to 5.5 m$^2$/g, a d10 particle size of from about 0.8 to 2 μm, a d50 particle size of from about 90 to 110 μm, and a d90 particle size of from about 240 to 250 μm. In certain embodiments, the calcination conditions as disclosed herein may result in agglomeration of the powder mixture and thus greater variability in particle size distributions may result. Thus, in embodiments, the particle size as referred to herein may include a single particle and in other embodiments the particle size as referred to herein may include an agglomerate comprising more than one particle or an agglomeration of multiple particles which may be measured, using the laser particle size detection methods as disclosed herein, as a single, large particle.

A die of a spark plasma sintering tool was lined with at least one graphite foil having properties as disclosed herein, and the die and each of the upper and lower punches of the tool comprised at least one graphite material as disclosed herein. The calcined powder mixture was disposed inside an inner volume defined by the tool of the spark plasma sintering tool wherein the tool at ambient temperature had a gap of from about 50 to 70 µm wherein the gap was configured between an inwardly facing surface of the at least one graphite foil and an outer wall of each of the upper and lower punches of the spark plasma sintering tool. Vacuum conditions of from $10^{-2}$ to $10^{-3}$ torr were created inside the inner volume, and a pressure of about 5 MPa was applied to form a powder compact having a packing density of about 50% from the calcined powder mixture. The powder compact inside the inner volume was heated according to the method as disclosed herein. Upon heating, consolidation of the powder compact was not detected by the sintering apparatus. Thus, the radial variance in average coefficient of thermal expansion (CTE) of the at least one graphite material comprising the die and/or upper and lower punches exceeded $0.3 \times 10^{-6}$ ppm/° C. across the temperature range in accordance with the method as disclosed herein (from ambient up to and including the sintering and/or the operational maximum temperature of the apparatus of about 2,000° C.), thus the required gap distance of from 10 to 70 µm was unable to be maintained across the required temperature range of from ambient temperature up to and including 2,000° C. The sintered ceramic body produced in accordance with this example fractured upon removal from the tool, indicating a low density and thereby low strength.

Example 1 (Sample 353 High Density, Large Dimension Polycrystalline Sintered Ceramic Body)

A sintered ceramic body of 406 mm largest dimension was prepared from a crystalline powder of yttrium oxide having a specific surface area of from 6 to 8 m²/g, and a d10 particle size of from 1 to 3 µm, a d50 particle size of from 4 to 6 µm, and a d90 particle size of from 7.5 to 9.5 µm. The powder had total impurities of about 25 ppm relative to the total mass of the yttrium oxide powder. A die of a spark plasma sintering tool was lined with at least one graphite foil having properties as disclosed herein, and the die and each of the upper and lower punches comprised at least one graphite material as disclosed herein. The yttria powder was disposed inside an inner volume defined by the spark plasma sintering tool having a gap of from about 50 to about 70 µm wherein the gap was configured between an inwardly facing surface of the at least one graphite foil and an outer wall of each of the upper punch and the lower punch of the sintering tool. Pre-application of pressure to the yttrium oxide powder was performed in a multiple step process whereby about 10 MPa pressure was pre-applied under a vacuum of from about $10^{-2}$ to $10^{-3}$ torr to form a powder compact having a packing density of from about 35 to 45% by volume. The powder compact was sintered at a temperature of 1,550° C. at a pressure of 20 MPa for a duration of 60 minutes. A radial variance from the average coefficient of thermal expansion (CTE) of the at least one graphite material comprising the die and/or the upper and lower punches about a central axis of the sintering tool was determined to be about $0.2 \times 10^{-6}$ ppm/° C. and less. The average density across five measurements was performed and a density of 5.020 g/cc, or 99.80% of the theoretical density for yttrium oxide (according to D. R. Lide, *CRC Handbook of Chemistry and Physics*, 84$^{th}$ Edition, 2012 ("the CRC Handbook"), the theoretical density of yttrium oxide is 5.03 g/cm³) was measured. Thus, using the tool having the specified gap distance and radial variance as disclosed herein, a high density, sintered ceramic of large dimension may be formed.

Example 2 (Sample 506 Polycrystalline YAG Sintered Ceramic Body of Large Dimension)

A powder of yttria (average purity of 99.998%, average impurities of about 21 ppm relative to a total mass of the yttrium oxide powder) having a specific surface area of 2 to 3 m²/g, a d10 particle size of from 2.5 to 4.5 µm, a d50 particle size of from 6 to 8 µm, and a d90 particle size of from 11 to 13 µm, and a powder of alumina (purity 99.9994%, impurities about 6 ppm relative to a total mass of the aluminum oxide) having a specific surface area of from 6.5 to 8.5 m²/g, a d10 particle size of from 0.75 to 1.5 µm, a d50 particle size of from 2 to 5 µm, and a d90 particle size of from 18 to 24 µm were combined in a molar ratio to form a sintered ceramic body comprising the yttrium aluminum garnet (YAG) phase upon sintering. Ball milling as known to those skilled in the art was performed and upon calcination at 1,050° C. for 6 hours in air, the calcined powder mixture was measured to have a specific surface area of from 3.5 to 5.5 m²/g, a d10 particle size of from 1 to 3.5 µm, a d50 particle size of from 5 to 8 µm, and a d90 particle/agglomerate size of from 130 to 160 µm. In certain embodiments, the calcination conditions as disclosed herein may result in agglomeration of the powder mixture and thus greater variability in particle size distributions may result. Thus, in embodiments, the particle size as referred to herein may include a single particle and in other embodiments the particle size as referred to herein may include an agglomerate comprising more than one particle or an agglomeration of multiple particles which may be measured, using the laser particle size detection methods as disclosed herein, as a single, large particle.

The purity of the calcined powder mixture was about the same as that of the starting powders. The powders, powder mixture, and/or calcined powder mixture may be sieved, tumbled, blended, and/or milled at various process steps according to known methods. A die of a spark plasma sintering apparatus was lined with at least one graphite foil having properties as disclosed herein, and the die and each of the upper and lower punches of the tool comprised at least one graphite material as disclosed herein. The calcined powder mixture was disposed inside an inner volume defined by the spark plasma sintering tool wherein the tool had a gap of from about 50 to 70 µm. The gap was configured between an inwardly facing surface of the at least one graphite foil and an outer wall of each of an upper punch and a lower punch of the sintering tool. A radial variance from the average coefficient of thermal expansion (CTE) of the at least one graphite material comprising the die and/or the upper and lower punches about a central axis of the sintering tool was determined to be about $0.1 \times 10^{-6}$ ppm/° C. and less. The calcined powder mixture was disposed inside the inner volume defined by the tool set of a sintering apparatus as disclosed herein, and vacuum conditions of from $10^{-2}$ to $10^{-3}$ torr were created inside the volume. The calcined powder mixture inside the inner volume was heated at 5° C./minute to 800° C., at which temperature a pressure of 5 MPa was applied to form a powder compact having a packing density of from about 40 to 50% by volume, then simultaneously heat was applied at a heating rate of from about 2 to about 3° C./minute and pressure was applied at a rate of from about 0.2 to about 0.25 MPa/minute to reach the sintering conditions of 1,650° C. and 15 MPa for 60 minutes to form a polycrystalline YAG sintered ceramic body in a disc shape having about 625 mm greatest dimension.

Density measurements were performed in accordance with ASTM B962-17 from samples cut across a radius of the sample and the density results are illustrated in FIG. 10. Five measurements each were performed at six locations along the radius, and an average density of 4.55 g/cc was measured, corresponding to 99.78% of theoretical for YAG. Densities across the radius were from 99.7 to 99.9% of theoretical (reported as 4.556 g/cc) for YAG. The variation in density as depicted in FIG. 10 was measured relative to the highest density measurement along the radius, and a maximum variation in density of 0.21% was measured. During sintering of the powders and powder mixtures using the spark plasma sintering tool as disclosed herein, pressure and temperature were applied in a radially symmetric configuration about the central axis 9. Properties such as high density (≥99% of theoretical for YAG) and minimal density variation (≤0.21%) were maintained across a radius, and also correspondingly across a diameter or greatest dimension of the sintered ceramic body. Thus, disclosed herein is a sintered ceramic body having an average density of 4.546 g/cc, ranging in density from 99.7 to 99.9% of the theoretical density for YAG (a commercially available sample of YAG was measured and average density of 4.556 g/cc was obtained and taken as the theoretical density of YAG as used herein), and having a maximum density variation of 0.21% and less across the diameter of the sintered ceramic body.

Example 3 (Sample 152 Polycrystalline Yttrium Oxide Sintered Ceramic Body)

A 100 mm sintered yttrium oxide body was formed from a yttrium oxide powder having a surface area of from 6.5 to 8.0 m$^2$/g and 99.999% purity, corresponding to an average total impurity of 18 ppm relative to a total mass of the yttrium oxide powder. The d10 particle size was from 1.5 to 3.5 µm, the median particle size (d50) was from 4 to 6 µm, and the d90 particle size was 7.5 to 9.5 µm. A die of a spark plasma sintering tool was lined with at least one graphite foil having properties as disclosed herein, and the die and each of the upper and lower punches of the tool comprised at least one graphite material as disclosed herein. The yttria powder was disposed inside an inner volume defined by the sintering tool, and vacuum conditions of from 10$^{-2}$ to 10$^{-3}$ torr were created inside the inner volume. The tool had a gap of from about 25 to about 50 µm, wherein the gap was configured between an inwardly facing surface of the at least one graphite foil and an outer wall of each of the upper punch and the lower punch of the sintering tool. A radial variance in average coefficient of thermal expansion (CTE) of the at least one graphite material comprising the die and/or the upper and lower punches about a central axis of the sintering tool was determined to be about 0.2×10$^{-6}$ ppm/° C. and less. Sintering was performed at 1,400° C. for 30 minutes at 30 MPa. Thereafter, annealing was performed in air at 1,400° C. for 8 hours. An average density of 5.02 g/cc was measured, corresponding to 99.9% of the theoretical density of yttrium oxide.

Example 4 (Sample 329 Polycrystalline Spinel Sintered Ceramic Body)

A powder of magnesia having total purity of 99.9994% corresponding to total impurities of 6 ppm, a surface area of 4-6 m$^2$/g, and an average or d50 particle size of between 3 and 4 µm was combined with a powder of alumina having total purity of 99.9995% corresponding to total impurities of 5 ppm, a surface area of 6-8 m$^2$/g and an average or d50 particle size of between 2.5 and 4.5 µm. The powders were weighed in relative amounts to create a powder mixture in a molar ratio to form spinel, MgAl$_2$O$_4$, having a cubic crystallographic structure upon sintering. The powder mixture was wet tumble milled according to methods as known to those skilled in the art. The powder mixture was calcined at 850° C. for 4 hours in an oxygen-containing environment and was measured to have a specific surface area of 5 to 6 m$^2$/g. The calcined powder mixture may be optionally sieved after calcination using methods known to the art. A die of a spark plasma sintering tool was lined with at least one graphite foil having properties as disclosed herein, and the die and each of the upper and lower punches of the tool comprised at least one graphite material as disclosed herein. The calcined powder mixture was disposed inside an inner volume defined by the sintering tool, and vacuum conditions of from 10$^{-2}$ to 10$^{-3}$ torr were created inside the inner volume. The tool had a gap of from about 20 to about 40 µm, wherein the gap was configured between an inwardly facing surface of the at least one graphite foil and an outer wall of each of the upper punch and the lower punch of the sintering tool. A radial variance from the average coefficient of thermal expansion (CTE) of the at least one graphite material comprising the die and/or the upper and lower punches about a central axis of the sintering tool was determined to be about 0.1×10$^{-6}$ ppm/° C. and less. The calcined powder mixture was then sintered in accordance with the method as disclosed herein at a temperature of 1,500° C., a pressure of 20 MPa for a duration of 30 minutes under vacuum to form a ceramic sintered body having a greatest dimension of 100 mm. Density on the sintered ceramic body was measured to be 3.546 g/cc or 99.04% of theoretical density. Hardness measurements were performed on the sintered ceramic body in accordance with ASTM C1327 using an applied load of 0.025 kgf. An average hardness of 15.06 GPa with a standard deviation of 0.75 was measured across eight measurements. Annealing was thereafter performed at 1,500° C. and the sintered ceramic body was allowed to passively cool in an air environment. Density on the annealed sintered ceramic body was measured to be 3.553 g/cc or 99.24% of theoretical density (according to L. Ping et al., "Magnesium aluminate (MgAl$_2$O$_4$) spinel produced via self-heat-sustained (SHS) technique," *Materials Research Bulletin*, 36 (2001), the theoretical density of magnesium aluminate spinel is 3.579 g/cm$^3$).

Although illustrated and described above with reference to certain specific embodiments and examples, the present disclosure is nevertheless not intended to be limited to the details shown. Rather, various modifications may be made in the details within the scope and range of equivalents of the claims and without departing from the spirit of the disclosure.

What is claimed is:

1. A spark plasma sintering tool having a central axis and creating sintered ceramic bodies having dimensions of about 100 mm to about 625 mm, the tool comprising:
   a. a die comprising a sidewall comprising an inner wall and an outer wall, wherein the inner wall has a diameter that defines an inner volume configured to receive at least one ceramic powder having a specific surface area (SSA) of from 1 to 18 m$^2$/g as measured according to ASTM C 127 4; and
   b. an upper punch and a lower punch operably coupled with the die, wherein each of the upper punch and the lower punch have an outer wall defining a diameter that is less than the diameter of the inner wall of the die thereby creating a gap between each of the upper punch and the lower punch and the inner wall of the die when at least one of the upper punch and the lower punch moves within the inner volume of the die, wherein the gap is from 10 μm to 100 μm wide, wherein the spark plasma sintering tool comprises on the inner wall of the die at least one conductive foil which has a minimum thickness of 25 μm and wherein the gap is measured from an inwardly facing surface of the conductive foil closest to the upper and lower punches to the outer wall of each of the upper and lower punches.

2. The spark plasma sintering tool of claim 1 wherein the at least one conductive foil comprises graphite, niobium, nickel, molybdenum, or platinum.

3. The spark plasma sintering tool of claim 1 wherein the die, the upper punch, and the lower punch comprise at least one graphite material.

4. The spark plasma sintering tool of claim 3, wherein the at least one graphite material has a grain size selected from the group consisting of from 1 to 50 μm, from 1 to 40 μm, from 1 to 30 μm, from 1 to 20 μm, from 5 to 50 μm, from 5 to 40 μm, from 5 to 30 μm, from 5 to 20 μm, from 5 to 15 μm, and from 5 to 10 μm; and the graphite material has a density selected from the group consisting of from 1.45 to 2.0 g/cc, from 1.45 to 1.9 g/cc, from 1.45 to 1.8 g/cc, from 1.5 to 2.0 g/cc, from 1.6 to 2.0 g/cc, from 1.7 to 2.0 g/cc, and from 1.7 to 1.9 g/cc.

5. The spark plasma sintering tool of claim 3 wherein the at least one graphite material includes an average coefficient of thermal and a radial deviation from the average coefficient of thermal expansion varies about the central axis of the tool by at least one amount selected from the group consisting of $0.3 \times 10^{-6}$ ppm/° C. and less, $0.25 \times 10^{-6}$ ppm/° C. and less, $0.2 \times 10^{-6}$ ppm/° C. and less, $0.18 \times 10^{-6}$ ppm/° C. and less, $0.16 \times 10^{-6}$ ppm/° C. and less, $0.14 \times 10^{-6}$ ppm/° C. and less, $0.12 \times 10^{-6}$ ppm/° C. and less, $0.1 \times 10^{-6}$ ppm/° C. and less, $0.0\,8 \times 10^{-6}$ ppm/° C. and less, and $0.06 \times 10^{-6}$ ppm/° C. and less.

6. The spark plasma sintering tool of claim 5 wherein the radial deviation from the average coefficient of thermal expansion of the at least one graphite material is maintained across a rotational position of from 0 to 360 degrees with respect to the rotational position of the die and upper and/or lower punches.

7. The spark plasma sintering tool of claim 1 wherein at least one of the upper punch and the lower punch is coupled to an electrode and at least one of the upper punch and the lower punch is in ohmic contact with the die.

8. The spark plasma sintering tool of claim 7 wherein the at least one ceramic powder is selected from the group consisting of yttrium oxide, aluminum oxide, sapphire, yttrium aluminum monoclinic (YAM), yttrium aluminum garnet (YAG), yttrium aluminum perovskite (YAP), zirconium oxide, titanium oxide, cordierite, mullite, cobaltite, magnesium aluminate spinel, silicon dioxide, quartz, calcium oxide, cerium oxide, ferrite, spinel, zircon, nickel oxide, copper oxide, strontium oxide, scandium oxide, samarium oxide, lanthanum oxide, lutetium oxide, erbium oxide, erbium aluminum garnet (EAG), hafnium oxide, vanadium oxide, niobium oxide, tungsten oxide, manganese oxide, tantalum oxide, terbium oxide, europium oxide, neodymium oxide, zirconium aluminate oxide, zirconium silicate oxide, hafnium aluminate oxide, hafnium silicate oxide, titanium silicate oxide, lanthanum silicate oxide, lanthanum aluminate oxide (LAO), yttrium silicate oxide, titanium silicate oxide tantalum silicate oxide, yttrium nitride, yttrium oxynitride, aluminum nitride, aluminum oxynitride, silicon nitride, silicon oxyni-tride, sialon materials, boron nitride, beryllium nitride, titanium nitride, tungsten nitride, forsterite, steatite, cordierite, mullite, barium titanate, lead titanate, lead zirconate titanate, Mn—Zn ferrite, Ni—Zn ferrite, and sialon.

9. The spark plasma sintering tool claim 1 wherein the die, the upper punch, and the lower punch create a homogeneous temperature distribution in the at least one ceramic powder.

10. The spark plasma sintering tool of claim 1 wherein the at least one ceramic powder has a specific surface area (SSA) selected from the group consisting of from 2 to 18 m²/g, from 3 to 18 m²/g, from 4 to 18 m²/g, from 5 to 18 from 6 to 18 m²/g, from 1 to 16 m²/g, from 2 to 16 m²/g, from 4 to 16 m²/g, from 6 to 16 m²/g, from 1 to 14 m²/g, from 1 to 12 m²/g, from 1 to 10 m²/g, from 1 to 8 m²/g, from 2 to 12 m²/g, from 2 to 10 m²/g, from 6 to 8 m²/g, and from 3 to 8 m²/g; and the at least one ceramic powder contains less than 100 ppm of total impurities; and the at least one ceramic powder has a resistivity of at least from about $1 \times 10^{+10}$ ohm-cm.

11. The spark plasma sintering tool of claim 1 further comprising: a vacuum chamber applying a vacuum to the die, the upper punch, and the lower punch;
    an upper punch electrode connected to the upper punch and a lower punch electrode connected to the lower punch;
    a power source providing an electric current to the upper punch electrode and to the lower punch electrode;
    a pressurizing system applying pressure to the upper punch and the lower punch; and a controller operating the various components of the tool.

12. The spark plasma sintering tool of claim 1 wherein the gap is axisymmetric about the central axis.

13. The spark plasma sintering tool of claim 1 wherein the gap is asymmetric about the central axis.

14. The spark plasma sintering tool of claim 1 wherein the gap has a width selected from the group consisting of from 10 μm to 70 μm, from 20 μm to 70 μm, from 30 μm to 70 μm, from 40 μm to 70 μm, from 50 μm to 70 μm, from 60 μm to 70 μm, from 10 to 60 μm, from 10 to 50 μm, and from 10 to 40 μm.

15. A computer readable medium storing processor-executable instructions adapted to cause one or more computing devices to create sintered ceramic bodies having dimensions of about 100 mm to about 625 mm by a method comprising:

a. disposing at least one ceramic powder having a specific surface area of from 1 to 18 m²/g as measured according to ASTM C 127 4 inside an inner volume of a spark plasma sintering tool, wherein the spark plasma sintering tool comprises a die comprising a sidewall comprising an inner wall and an outer wall, wherein the inner wall has a diameter that defines the inner volume, an upper punch and a lower punch operably coupled with the die, wherein each of the upper punch and the lower punch have an outer wall defining a diameter that is less than the diameter of the inner wall of the die thereby creating a gap from 10 μm to 100 μm wide between each of the upper punch and the lower punch and the inner wall of the die when at least one of the upper punch and the lower punch moves within the inner volume of the die, wherein the spark plasma sintering tool comprises on the inner wall of the die at least one conductive foil which has a minimum thickness of 25 μm and wherein the distance of the gap is measured from the inwardly facing surface of the conductive foil closest to the upper and lower punches to the outer wall of each of the upper and lower punches;
b. moving at least one of the upper punch and the lower punch to apply pressure to the ceramic powder while heating the ceramic powder to a sintering temperature and sintering the ceramic powder to form the sintered ceramic body; and
c. lowering the temperature of the sintered ceramic body.

* * * * *